(12) United States Patent
Nammi et al.

(10) Patent No.: US 9,520,963 B2
(45) Date of Patent: Dec. 13, 2016

(54) MODULATION AND CODING SCHEME SELECTION FOR LINK ADAPTATION

(71) Applicant: Telefonaktiebolaget L M Ericsson (publ), Stockholm (SE)

(72) Inventors: Sairamesh Nammi, Kista (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 114 days.

(21) Appl. No.: 14/395,822

(22) PCT Filed: Mar. 22, 2013

(86) PCT No.: PCT/SE2013/050324
§ 371 (c)(1),
(2) Date: Oct. 21, 2014

(87) PCT Pub. No.: WO2014/148962
PCT Pub. Date: Sep. 25, 2014

(65) Prior Publication Data
US 2016/0006539 A1    Jan. 7, 2016

(51) Int. Cl.
*H04W 4/00* (2009.01)
*H04L 1/00* (2006.01)
*H04B 7/06* (2006.01)

(52) U.S. Cl.
CPC ........... *H04L 1/0003* (2013.01); *H04L 1/0009* (2013.01); *H04L 1/0015* (2013.01); *H04B 7/0684* (2013.01)

(58) Field of Classification Search
CPC ................................ H04L 1/00; H04L 1/0003
(Continued)

(56) References Cited

U.S. PATENT DOCUMENTS

2004/0022177 A1* 2/2004 Awad ................ H04B 1/70755
370/204
2007/0183529 A1   8/2007 Tujkovic et al.
(Continued)

FOREIGN PATENT DOCUMENTS

| EP | 1387517 A1 | 2/2004 |
| EP | 2375605 A1 | 10/2011 |
| WO | 2009117578 A1 | 9/2009 |

OTHER PUBLICATIONS

3GPP, "3rd Generation Partnership Project; Technical Specification Group Radio Access Network; Multiplexing and channel coding (FDD) (Release 11)", 3GPP TS 25.212 V11.3.0, Sep. 2012, 1-135.
(Continued)

*Primary Examiner* — Farah Faroul
(74) *Attorney, Agent, or Firm* — Murphy, Bilak & Homiller, PLLC

(57) ABSTRACT

There is provided a method of operating a mobile device that is configured to receive multi-antenna downlink transmissions from a network node, the mobile device being configured to perform link adaptation to select a suitable modulation and/or coding scheme, MCS, from a plurality of available modulation and/or coding schemes, MCSs, for the multi-antenna downlink transmission, the method comprising (i) determining whether to use an unrestricted set of MCSs or a restricted set of MCSs when performing link adaptation for the multi-antenna downlink transmission, the unrestricted set of MCSs comprising all of the plurality of available MCSs, the restricted set comprising a subset of the plurality of available MCSs; and (ii) performing the link adaptation to select the MCS for the multi-antenna downlink transmission using the unrestricted or restricted set of MCSs determined in step (i).

12 Claims, 21 Drawing Sheets

(58) Field of Classification Search
USPC .......................................................... 370/252
See application file for complete search history.

(56) References Cited

U.S. PATENT DOCUMENTS

| | | | |
|---|---|---|---|
| 2008/0212526 A1* | 9/2008 | Oyman | H04B 7/0691 370/329 |
| 2009/0086686 A1 | 4/2009 | Rudolf et al. | |
| 2010/0014500 A1* | 1/2010 | Lee | H04L 1/0017 370/342 |
| 2010/0284454 A1 | 11/2010 | Oteri et al. | |
| 2011/0080968 A1* | 4/2011 | Seo | H04B 7/0417 375/267 |
| 2012/0099472 A1* | 4/2012 | Joko | H04L 1/0021 370/252 |
| 2012/0106383 A1* | 5/2012 | Gormley | H04L 1/0026 370/252 |
| 2013/0343255 A1* | 12/2013 | Han | H04L 1/0009 370/312 |
| 2015/0223135 A1* | 8/2015 | Ratasuk | H04W 16/32 455/436 |
| 2016/0211944 A1* | 7/2016 | Kenney | H04L 5/003 |

OTHER PUBLICATIONS

3GPP, "3rd Generation Partnership Project; Technical Specification Group Radio Access Network; Multiplexing and channel coding (FDD) (Release 11)", 3GPP TS 25.212 V11.4.0, Dec. 2012, 1-158.

Unknown, Author, "4-branch MIMO for HSDPA", 3GPP TSG RAN WG1 Meeting #65, R1-111763, Source: Ericsson, Barcelona, Spain, May 9-13, 2011, 1-17.

Unknown, Author, "Common Pilot Design for Four branch MIMO System", 3GPP TSG RAN WG1 Meeting #68, R1-120352, Source: Ericsson, ST-Ericsson, Dresden, Germany, Feb. 6-10, 2012, 1-11.

Unknown, Author, "New WI: Four Branch MIMO transmission for HSDPA", 3GPP TSG-RAN meeting #53, RP-111393 (Feature Part), Ericsson, Fukuoka, Japan, Sep. 13-16, 2011, 1-5.

Unknown, Author, "New WI: Four Branch MIMO transmission for HSDPA", 3GPP TSG-RAN meeting #53, RP-111393 (Performance Part), Ericsson, Fukuoka, Japan, Sep. 13-16, 2011, 1-5.

Unknown, Author, "New WI: Four Branch MIMO transmission for HSDPA", 3GPP TSG-RAN meeting #53, RP-111393 (Core Part), Ericsson, Fukuoka, Japan, Sep. 13-16, 2011, 1-6.

* cited by examiner

MODULATION AND CODING SCHEME SELECTION FOR LINK ADAPTATION

TECHNICAL FIELD OF THE INVENTION

The invention relates to methods, mobile devices and nodes for use in a mobile communication network, and in particular to ways in which a mobile device configured for downlink multi-antenna operation can perform link adaptation to reduce or avoid a loss in throughput.

BACKGROUND TO THE INVENTION

MIMO Systems

MIMO (multiple input multiple output) is an advanced antenna technique to improve spectral efficiency in mobile communication networks and thereby boost the overall capacity of the system. The MIMO technique uses a commonly known notation (M×N) to represent MIMO configuration in terms number of transmit (M) and receive antennas (N). The common MIMO configurations used or currently discussed for various technologies are: (2×1), (1×), (2×2), (4×2), (8×2) and (8×4). The configurations represented by (2×1) and (1×2) are special cases of MIMO and they correspond to transmit diversity and receiver diversity respectively. The configuration (2×2) is used in WCDMA release 7 and configurations ((4×4), (4×2)) are being defined in release 11.

Currently a four transmitting antenna (4Tx) transmission scheme for High Speed Downlink Packet Access (HSDPA) is discussed within 3GPP standardization (for example as described in "New WI: Four Branch MIMO transmission for HSDPA" by Ericsson, RP-111393; "4-Branch MIMO for HSDPA" by Ericsson, R1-111763; and "Common Pilot Design for Four Branch MIMO System" by Ericsson, R1-120352). Previous versions of the specification supported up to 2 TX antenna transmissions.

In order to support 4Tx MIMO transmissions, it is necessary to obtain four channel estimates in order to characterize each of the spatial layers, which will require new pilot signals. Pilots are needed for two main functionalities; channel state information (CSI) estimation through channel sounding, where rank, channel quality information (CQI) and precoding control index (PCI) are estimated, and channel estimation for demodulation purposes. The term pilot is also interchangeably called a reference signal in this application, but they are considered to have the same meaning. A pilot or reference signal is a known sequence of signals which are pre-defined or known to the UE in advance. Other commonly known terms which have the same meaning as 'pilots' are UE specific reference signal, dedicated reference signal, demodulation reference signal (DMRS), CSI reference signal (CSI-RS), cell specific reference signal (CRS) etc. The terms dedicated pilot, dedicated reference signal, demodulation reference signal or UE specific reference signal is used for a specific purpose in a particular direction to assist, for example, the demodulation of transmission using beamforming or for a specific UE or for a group of UEs or any combination thereof. On the other hand, a common pilot, common reference signal or cell specific reference signal is sent over the entire cell and is used for multiple purposes and is for use by all UEs e.g. measurements, demodulation etc.

Two different approaches are possible for 4-branch MIMO. The first is to use common pilots for both CSI and channel estimation for data demodulation. The second is to use common pilots for CSI estimation and additional high power pilots without precoding for channel estimation for data demodulation. In this context, "common pilots" refer to pilots that are made available to all users and which are transmitted without user specific beamforming.

Common pilots may be transmitted at instances in which legacy users (i.e. users that are not designed according to the latest releases of the specifications, such as users designed according to Release 7 MIMO and Release 99), who are not able to demodulate 4TX transmissions, are scheduled. These legacy users cannot make use of the energy in the common pilots. However, the energy in the additional common pilots will reduce the amount of energy available for High Speed-Physical Data Shared Channel (HS-PDSCH) scheduling to the legacy users. Moreover, the additional common pilots cause interference to these users. Therefore, to minimize performance impacts to non 4TX users, it is important that the power of the common pilots is reduced to a low value.

Unfortunately, however, with reduced pilot power of common pilots, the demodulation performance will be impacted. Hence, in addition to transmitting two common pilots with low power, two additional pilots with higher power are introduced for demodulation in a four branch MIMO system. These additional pilots can be referred to as "scheduled" or "demodulation" pilots. A base station (Node B) starts transmitting these additional pilots based on channel conditions and available power.

Use of Common Pilots for CSI Estimation and Data Demodulation

FIG. 1 illustrates a system 2 that uses common pilots for CSI estimation and data demodulation. On the Node B 4 (transmitting) side, known pilot symbols 6 are transmitted by transmitter module 8 for channel sounding. A receiver 10 in the UE 12 estimates channel quality (typically signal to interference plus noise ratio, SINR) from channel sounding using channel estimator 14, and computes a preferred precoding matrix W using precoder matrix calculator 16 and CQI for the next downlink transmission from the Node B 4. This information is conveyed by the UE 12 to the Node B 4 through a feedback channel 18 (e.g. a High Speed-Dedicated Physical Control Channel, HS-DPCCH). The Node B 4 processes this information and decides the precoding matrix and modulation (and some other parameters such as transport block size etc.) and conveys this information to the UE 12 through a downlink control channel. Data 20 is transmitted by the Node B 4 to the UE 12 with the modulation and coding rate indicated in the downlink control channel. The data 20 is pre-multiplied by precoding vector/matrix W in precoder block 22 before passing to the antenna ports 8. For data demodulation in the UE 12, the channel estimator 14 in the UE 12 estimates the channel H from the common pilot symbols, and a data detector 24 uses the channel estimate H to demodulate the data.

As noted above, common pilot-only solutions will have a negative impact on legacy users unless the power on the additional (common) pilots is minimal. FIG. 2 shows the performance of a pilot reduction scheme on the sector throughput with different numbers of users per sector. For this simulation, it is assumed that all the users are Release-7 MIMO capable with 2 receive antennas. The additional interference due to the additional third and fourth pilots is considered with different power levels. The pilot powers for the pilots transmitted by the first and second antennas are set to −10 dB and −13 dB respectively. It can be seen from FIG. 2 that as the power of the additional pilots is decreased, the impact on the system throughput performance is less. For example, if the relative pilot power (i.e. compared to the maximum downlink power in log scale) is around −19 dB then the impact on the legacy users is almost negligible.

However, if the power is minimal, then the demodulation performance of 4TX users will be adversely impacted. FIGS. 3 and 4 shows the Link level throughput for a UE with 3 different carrier-to-interference (C/I) ratios for 4×4 MIMO (FIG. 3) and 4×2 MIMO (FIG. 4). As discussed above, when operating with common pilots it will be necessary to minimize the power transmitted on the 3rd and 4th pilots in order to minimize impact to legacy users.

The figures show the performance with reduced pilot powers for the 3rd and 4th antennas with the pilot powers for the 1st and 2nd antennas being kept as −10 and −13 dB respectively. It can be observed that as the pilot powers are reduced, the performance degrades due to bad channel estimation for CQI and data demodulation. The degradation is severe at high C/I compared to low C/I. This is because at high C/I, there is a high probability of rank 3 and rank 4 transmissions and/or high data rates, which require a larger amount of pilot power energy. On the other hand, low data rates and/or rank selections, which occur at low C/I, can be demodulated with a lower amount of pilot energy (i.e. a higher traffic to pilot ratio).

Introduction of additional pilots when any 4 branch MIMO user is scheduled may cost some additional overhead and may not give benefit for all the scenarios. In reality, a high amount of pilot power is required when the UE is attempting to demodulate high data rates with high rank.

Use of Common Pilots for CSI Estimation and Additional Pilots for Data Demodulation FIG. 5 shows a system 32 that uses common pilots for CSI estimation and additional pilots for data demodulation. The system 32 is similar to that shown in FIG. 1, with like reference numerals indicating similar features. Similar to the common pilot scheme, known pilot symbols 6 are used for channel sounding, the UE 12 conveys the preferred precoding matrix W, CQI through the feedback channel 18. For downlink data transmission, the Node B 4 uses this information and chooses the precoding matrix W, CQI and the transport block size. For data transmission, data 20 is multiplied by the precoding matrix W selected by the Node B 4 and transmitted. In addition to the data 20, additional pilots 34, that are similar to common pilots 6 but that are not precoded are transmitted with high power from all or a subset of antennas (for example only the 3rd and 4th antennas). As indicated above, these additional pilots 34 are called scheduled pilots. The UE 12 estimates the channel H for data demodulation from these additional pilots 34 in addition to the common pilots 6.

FIG. 6 shows link performance for a system 32 using common pilots for CSI estimation and scheduled pilots for data demodulation. Note that with ideal channel estimation, the performance of the scheduled common pilot solution is always inferior to the common pilot solution with power of −13 dB on the third and fourth antennas. This is due to the additional power allocated to these scheduled pilots. It can also be seen that the performance of scheduled pilots with realistic estimation is close to that of the common pilot solution with pilot power of −13 dB. Hence the scheduled pilot solution is attractive in terms of link performance for a four branch MIMO system.

It can be seen that the performance gains with scheduled pilots are almost negligible at low to medium geometries. Hence the question arises about whether scheduled pilots are needed for all geometries. From FIG. 6 it can be observed that for low to medium geometries/data rates, the common pilot solution is sufficient to give a reasonable performance. Additional pilots are only needed at high signal to noise ratios (SNR) or for high data rate applications.

Conveying Information about Demodulation Pilots

Thus, according to the simulation results shown in FIGS. 2, 3, 4 and 6, common pilots are transmitted for CSI estimation and additional pilots are chosen for data demodulation based on user information available at the Node B. Examples of suitable user information include CSI reports (e.g. CQI, PCI, rank index, RI etc.), user signal quality in general, data rate, service type (e.g. whether the user requires higher data rate or not), geometry (e.g. ratio of received power from the serving cell to that from neighbouring cells) etc. The signal quality can be expressed in terms of for example CQI, SINR, SNR, block error rate (BLER), bit error rate (BER), ACK/NACK for downlink (DL) signal reception, common pilot channel (CPICH) measurements (CPICH received signal code power, CPICH RSCP, CPICH Ec/No) etc.

For example, when the users are nearer to the cell centre (i.e. at high geometries hence when higher order modulations such as 16 quadrature amplitude modulation (QAM) and 64 QAM can be used) additional pilots can be transmitted for data demodulation. Otherwise common pilots are sufficient for data demodulation.

FIG. 7 a signalling diagram indicating how demodulation pilot information is provided to the UE 12. In this figure, common pilots are transmitted from the Node B 4 continuously for CSI estimation (represented as signal 52 in FIG. 7). The UE 12 computes the channel state information channel quality information (CQI), precoding control index (PCI) and rank index (RI) through these channels and reports this information in an uplink feedback channel (e.g. HS-DP-CCH), shown as signal 54. Once the Node B 4 receives this information, the scheduler in the Node B 4 decides whether common pilots are needed or scheduled pilots are needed for demodulation.

This can be done based on signal quality (e.g. SNR, SINR etc), user location or the assigned modulation and code rate, etc. If it is decided that the demodulation pilots need to be transmitted, the Node B 4 will convey this information through separate signalling 56 using High Speed-Shared Control Channel (HS-SCCH) orders (i.e. dedicated bit patterns used for switching on demodulation pilots). The HS-SCCH also contains additional information including channelisation code for HS-DSCH, transport format (e.g. MCS) for transmission on HS-DSCH, HARQ feedback for DL transmission etc. If the UE 12 is able to decode this message it will send an ACK to this order to the Node B 4 through the feedback channel (HS-DPCCH), which is shown as signal 58. The common pilots and additional (scheduled) common pilots are then transmitted by the Node B 4 (as shown by signal 62).

The data is transmitted by the Node B 4 to the UE 12 on HS-PDSCH (shown by signal 64). The UE 12 can use the scheduled common pilots for demodulation until again informed by the Node B 4 to use common pilots.

Link Adaptation Using Common Pilots in a MIMO System

FIG. 8 shows a message sequence chart for HSDPA wireless communications. The Node B 4 transmits common pilots with known symbols to the UE 12 through pilot channels 72. The UE 12 computes channel state information (CSI) from the common pilots and conveys this information to the Node B 4 through a feedback channel 74. The Node B 4 processes this information, signals the appropriate control parameters for the data transmission to the UE 12 through a downlink control channel 76 and then sends data to the UE 12 through a downlink data traffic channel 78 according to the determined parameters.

The UE computes the channel state information (CSI) from the common pilots using a link adaptation algorithm. The flow chart in FIG. 9 shows a conventional method of determining CSI information.

In the first step, step 82, the UE computes a signal quality, e.g. the SNR, for each entity in the precoding codebook. The precoding codebook is specified in TS 3GPP 25.212, Version 11.3. For a 4-branch MIMO system, the precoding codebook consists of rank-1, rank-2, rank-3 and rank-4 transmissions, and for a 2-branch MIMO system, the precoding codebook consists of rank 1 and rank 2 transmissions.

Next, in step 84, the UE computes the capacity (C) of each entity in terms of user bit rate, which is determined from a function which maps the downlink signal quality (Q) to the user bit rate (B). A general expression for such a function can be expressed as follows:

$$C = f(\alpha Q)$$

or $$B = g(\alpha Q)$$

where α is a weighting factor which may depend upon receiver characteristic of the UE. For example more precisely if the signal quality is the SNR, then the capacity can be computed using the formula: capacity, $C = \log_2(1+SNR)$.

In step 86, the UE identifies the precoding control index (PCI) that maximizes the capacity.

For the signal quality (SNR) corresponding to the maximum capacity, the UE performs link adaptation (step 88) to select the modulation and coding scheme (MCS) most suitable for this signal quality (SNR). The selected MCS is then translated into a CSI value (e.g. CQI), which in turn is reported by the UE to the network node. The network node uses the UE reported CSI (e.g. CQI) to select the transport format (e.g. TB size, MCS etc) for scheduling the UE for downlink transmission. For example the transport format related parameters (e.g. modulation type, transport block size, UE identity etc) are conveyed to the UE in a DL control channel (e.g. HS-SCCH in HSPA and PDCCH in LTE) to enable the UE to decode the shared channel which contains the DL transmission (e.g. over HS-DSCH in HSPA or PDSCH in LTE) intended for this UE.

The modulation scheme may be selected from quadrature phase shift keying (QPSK), 16-quadrature amplitude modulation (16QAM) or 64 quadrature amplitude modulation (64QAM). In one example the coding scheme can be selected from different coding rates e.g. convolutional coding with rate 1/2, convolutional coding with rate 1/3 etc. In another example the coding scheme can be selected from different types of coding e.g. convolutional coding, turbo coding etc. In yet another example the coding scheme can be selected from a combination of different coding rates and types of coding e.g. convolutional coding 1/2, turbo coding 1/3 etc.

Step 88 is typically performed using lookup tables. An example of such a lookup table is shown in table 1. The network node uses the UE reported CQI to derive the transport format related parameters for scheduling the UE on the downlink for the downlink transmission e.g. over HS-DSCH channel in HSPA or PDSCH in LTE.

TABLE 1

Pre-defined table mapping the CQI to transport format

| CQI value | Transport Block Size | Number of HS-PDSCH | Modulation | Reference power adjustment Δ | $N_{IR}$ | $X_{RV}$ |
| --- | --- | --- | --- | --- | --- | --- |
| 0 | N/A | | Out of range | | | |
| 1 | 136 | 1 | QPSK | 0 | 43200 | 0 |
| 2 | 176 | 1 | QPSK | 0 | | |
| 3 | 232 | 1 | QPSK | 0 | | |
| 4 | 320 | 1 | QPSK | 0 | | |
| 5 | 376 | 1 | QPSK | 0 | | |
| 6 | 464 | 1 | QPSK | 0 | | |
| 7 | 648 | 2 | QPSK | 0 | | |
| 8 | 792 | 2 | QPSK | 0 | | |
| 9 | 928 | 2 | QPSK | 0 | | |
| 10 | 1264 | 3 | QPSK | 0 | | |
| 11 | 1488 | 3 | QPSK | 0 | | |
| 12 | 1744 | 3 | QPSK | 0 | | |
| 13 | 2288 | 4 | QPSK | 0 | | |
| 14 | 2592 | 4 | QPSK | 0 | | |
| 15 | 3328 | 5 | QPSK | 0 | | |
| 16 | 3576 | 5 | 16-QAM | 0 | | |
| 17 | 4200 | 5 | 16-QAM | 0 | | |
| 18 | 4672 | 5 | 16-QAM | 0 | | |
| 19 | 5296 | 5 | 16-QAM | 0 | | |
| 20 | 5896 | 5 | 16-QAM | 0 | | |
| 21 | 6568 | 5 | 16-QAM | 0 | | |
| 22 | 7184 | 5 | 16-QAM | 0 | | |
| 23 | 9736 | 7 | 16-QAM | 0 | | |
| 24 | 11432 | 8 | 16-QAM | 0 | | |
| 25 | 14424 | 10 | 16-QAM | 0 | | |
| 26 | 15776 | 10 | 64-QAM | 0 | | |
| 27 | 21768 | 12 | 64-QAM | 0 | | |
| 28 | 26504 | 13 | 64-QAM | 0 | | |
| 29 | 32264 | 14 | 64-QAM | 0 | | |
| 30 | 32264 | 14 | 64-QAM | −2 | | |

Multi-Carrier Deployment

To enhance peak-rates within a technology, multi-carrier or carrier aggregation solutions are known. For example, it is possible to use multiple 5 MHz carriers in High Speed Packet Access (HSPA) to enhance the peak-rate within the HSPA network, and it is intended for Long Term Evolution (LTE) Release 10 to facilitate aggregation of multiple LTE carriers.

In LTE, each carrier in a multi-carrier or carrier aggregation system is generally termed a component carrier (CC) or is sometimes also referred to as a cell. In simple words the component carrier (CC) means an individual carrier in a multi-carrier system. The term carrier aggregation (CA) is also called "multi-carrier system", "multi-cell operation", "multi-carrier operation", "multi-carrier" transmission and/or reception. This means the CA is used for transmission of signalling and data in the uplink and downlink directions. One of the CCs is the 'primary' carrier or 'anchor' carrier and the remaining ones are called secondary or supplementary carriers. Generally the primary or anchor CC carries the essential UE-specific signalling. The primary CC exists in both uplink and downlink CA. The network may assign different primary carriers to different UEs operating in the same sector or cell.

The CCs belonging to the CA may belong to the same frequency band (aka intra-band CA) or to a different frequency band (inter-band CA) or any combination thereof (e.g. two CCs in band A and 1 CC in band B). The inter-band CA comprising of carriers distributed over two bands is also referred to as dual-band-dual-carrier-HSDPA (DB-DC-HSDPA) in HSPA. Furthermore the CCs in intra-band CA may be adjacent or non-adjacent in the frequency domain (aka intra-band non-adjacent CA). A hybrid CA comprising of intra-band adjacent, intra-band non-adjacent and inter-band is also possible.

In HSPA Release 10, up to four DL carriers can be aggregated as 4C-HSDPA where the DL carriers or DL cells may be belong to the same frequency band or split over two different frequency bands e.g. three adjacent DL carriers in band I (2.1 GHz) and one DL carrier in band VIII (900 MHz). In HSPA Release 11, up to eight DL carriers may be aggregated and may be termed as 8C-HSDPA; and the DL carriers may be distributed over two (or even) more bands. In the present version of the HSPA and LTE specifications (i.e. Release 10) all the carriers that belong to one frequency band have to be adjacent when configured by higher layers (e.g. radio resource control, RRC). In Release 11, non-adjacent carriers within the same band are also possible.

In LTE intra-band CA, in principle up to five DL carriers each of 20 MHz may be aggregated by the UE; at least the UE requirements exist for two DL carriers i.e. up to 40 MHz. In LTE inter-band CA, two DL carriers belonging to two different bands can be aggregated by the UE.

SUMMARY

As described above, in a conventional system the base station (Node B) informs the mobile device (UE) that is using or wanting to use MIMO whether the two additional scheduled pilots (or, in LTE: UE specific reference signals, dedicated reference signals, CSI reference signals (CSI-RS) or demodulation reference signals (DMRS) are enabled to assist the demodulation of the data channel at the UE. In general the Node B decides whether to activate the two additional pilots based on the geometry (i.e. the ratio of the power received from the serving cell of the UE to the power received from neighbouring cells), and for example if the geometry is greater than a certain threshold, then the Node B sends an HS-SCCH order to the UE and activates the demodulation pilots. On receipt of the HS-SCCH order, the UE sends CQI by assuming that Node B uses two additional pilots.

However, there may be instances where the UE doesn't receive an HS-SCCH order from the Node B, for example if the Node B does not decide to activate the two additional demodulation pilots, even though the UE may be at high geometry. In this situation, then there will be a throughput loss for the UE if it uses the conventional link adaptation algorithm described above.

Therefore, there is a need for a way of operating a mobile device having downlink multi-antenna capability that can perform link adaptation using only common pilots received from the base station and that provides improved performance over conventional link adaptation methods used when demodulation pilots are not available.

According to a first aspect, there is provided a method of operating a mobile device that is configured to receive multi-antenna downlink transmissions from a network node, the mobile device being configured to perform link adaptation to select a suitable modulation and/or coding scheme, MCS, from a plurality of available modulation and/or coding schemes, MCSs, for the multi-antenna downlink transmission, the method comprising (i) determining whether to use an unrestricted set of MCSs or a restricted set of MCSs when performing link adaptation for the multi-antenna downlink transmission, the unrestricted set of MCSs comprising all of the plurality of available MCSs, the restricted set comprising a subset of the plurality of available MCSs; and (ii) performing the link adaptation to select the MCS for the multi-antenna downlink transmission using the unrestricted or restricted set of MCSs determined in step (i).

Preferably, the restricted set of MCSs is such that there is at least one modulation and/or coding scheme in the plurality of available modulation and/or coding schemes that is in the unrestricted set but not in the restricted set.

Preferably, the plurality of available modulation schemes comprise QPSK, 16QAM and 64QAM, and wherein the restricted set comprises at least QPSK but not 64QAM.

The MCSs available in the unrestricted and restricted sets may be predetermined, for example defined in a standard.

In preferred embodiments step (i) comprises evaluating one or more criteria to determine whether to use the unrestricted set of MCSs or the restricted set of MCSs when performing link adaptation for the multi-antenna downlink transmission.

In certain embodiments step (i) comprises comparing a downlink signal quality to a threshold value; and determining that the unrestricted set of MCSs is to be used if the signal quality is less than the threshold value.

The downlink signal quality may be any of a signal-to-noise ratio, SNR, channel quality information, CQI, signal to interference plus noise ratio, SINR, block error rate, BLER, bit error rate, BER, ACK/NACK for downlink signal reception, common pilot channel, CPICH, measurements, CPICH received signal code power, CPICH RSCP, CPICH Ec/No or a geometry factor.

The threshold value may be predetermined or set by one of a network node or the mobile device based on the radio conditions and/or the antenna configuration of the mobile device and/or the antenna transmission mode.

In some embodiments, step (i) comprises determining that the restricted set of MCSs is to be used if the signal quality is greater than the threshold value.

In alternative embodiments step (i) comprises or further comprises determining whether the network is sending dedicated pilots or reference signals to the mobile device for demodulation of the multi-antenna downlink transmission; in the event that dedicated pilots or reference signals are being transmitted, determining that the unrestricted set of MCSs is to be used, and otherwise determining that the restricted set of MCSs is to be used.

In further alternative embodiments step (i) comprises or further comprises determining whether the network has sent dedicated pilots or reference signals to the mobile device for demodulation of the multi-antenna downlink transmission during a predefined time interval; in the event that dedicated pilots or reference signals have been transmitted during the preceding time interval, determining that the unrestricted set of MCSs is to be used, and otherwise determining that the restricted set of MCSs is to be used.

In yet further alternative embodiments step (i) comprises or further comprises determining whether the network is sending dedicated pilots or reference signals to the mobile device for demodulation; in the event that dedicated pilots or reference signals are being transmitted, determining whether the dedicated pilots or reference signals are being transmitted with restrictions; in the event that the dedicated pilots or reference signals are not being transmitted with restrictions, determining that the unrestricted set of MCSs is to be used, and otherwise determining that the restricted set of MCSs is to be used.

In a network where reference signals are used, the reference signals may be any of UE specific reference signals, dedicated reference signals, CSI reference signals (CSI-RS) and demodulation reference signals (DMRS).

In some embodiments step (i) can be performed following receipt of a signal from a network node indicating that the mobile device is permitted to determine whether to use an unrestricted set or a restricted set of MCSs when performing link adaptation for the multi-antenna downlink transmission.

In some embodiments, step (i) comprises receiving a signal from a network node indicating the set of MCSs the mobile device is to use when performing link adaptation for the multi-antenna downlink transmission.

In some embodiments, the method further comprising the step of transmitting information on the capability of the mobile to a network node, the capability information indicating whether the mobile device is capable of determining to use an unrestricted set of MCSs or a restricted set of MCSs when performing link adaptation for the multi-antenna downlink transmission and to perform the link adaptation to select the MCS for the multi-antenna downlink transmission using the unrestricted or restricted set of MCSs based on the determination.

In some embodiments the method further comprises, after the step of performing, the step of transmitting information on the set of MCSs used to perform link adaptation to a network node.

In preferred embodiments the step of performing the link adaptation to select the MCS for the multi-antenna downlink transmission using the unrestricted set of MCSs comprises using a first look-up table comprising entries for all of the plurality of available MCSs, and the step of performing the link adaptation to select the MCS for the multi-antenna downlink transmission using the restricted set of MCSs comprises using a second look-up table comprising entries for only the MCSs in the restricted set.

In embodiments in which the mobile device is operating using carrier aggregation, step (ii) can comprise performing link adaptation on the primary carrier using the unrestricted or restricted set of MCSs determined in step (i), and the method can further comprise determining whether to perform link adaptation on one or more secondary carriers using the unrestricted or restricted set of MCSs determined in step (i).

According to a second aspect of the invention, there is provided a mobile device for use in a mobile communication network, the mobile device comprising a transceiver module configured to receive multi-antenna downlink transmissions from the network; and a processing module configured to (i) determine whether to use an unrestricted set of modulation and/or coding schemes, MCSs, or a restricted set of MCSs when performing link adaptation for the multi-antenna downlink transmission, the unrestricted set of MCSs comprising all of a plurality of available MCSs, the restricted set comprising a subset of the plurality of available MCSs; and (ii) perform the link adaptation to select a suitable modulation and/or coding scheme, MCS, for the multi-antenna downlink transmission using the unrestricted or restricted set of MCSs determined in (i).

Embodiments of the mobile device are contemplated in which the processing module is further configured to operate so as to perform the various method embodiments described above.

According to a third aspect of the invention, there is provided a method of operating a network node in a mobile communication network, the mobile network comprising a mobile device configured to receive multi-antenna downlink transmissions from the network node, the mobile device being configured to perform link adaptation to select a suitable modulation and/or coding scheme, MCS, from a plurality of available modulation and/or coding schemes, MCSs, for the multi-antenna downlink transmission, the method of operating the network node comprising determining whether the mobile device is permitted to or should use a restricted set of MCSs when performing link adaptation for the multi-antenna downlink transmission, the restricted set comprising a subset of the plurality of available MCSs; and in the event that it is determined that the mobile device is permitted to or should use a restricted set of MCSs when performing link adaptation, sending a signal to the mobile device indicating that the mobile device is permitted to or should use the restricted set of MCSs.

In some embodiments, in the event that it is determined that the mobile device is not permitted to or should not use a restricted set of MCSs when performing link adaptation, the method further comprises sending a signal to the mobile device indicating that the mobile device is not permitted to or should not use the restricted set of MCSs or a signal indicating that the mobile device is to use an unrestricted set of MCSs comprising all of the plurality of available MCSs.

Preferably, the step of determining comprises evaluating one or more criteria to determine whether the mobile device is permitted to or should use the restricted set of MCSs when performing link adaptation for the multi-antenna downlink transmission.

In some embodiments, the step of determining comprises comparing a downlink signal quality to a threshold value; and determining that the mobile device is not permitted to or should not use the restricted set of MCSs if the signal quality is less than the threshold value.

In some embodiments, the step of determining comprises determining that the mobile device is permitted to or should use the restricted set of MCSs if the signal quality is greater than the threshold value.

In alternative embodiments, the step of determining comprises or further comprises determining whether the network node is sending dedicated pilots or reference signals to the mobile device for demodulation of multi-antenna downlink transmissions; in the event that dedicated pilots or reference signals are being transmitted, determining that the mobile device is not permitted to or should not use the restricted set of MCSs, and otherwise determining that the mobile device is permitted to or should use the restricted set of MCSs.

In further alternative embodiments, the step of determining comprises or further comprises determining whether the network node has sent dedicated pilots or reference signals to the mobile device for demodulation of multi-antenna downlink transmissions during a predefined time interval; in the event that dedicated pilots or reference signals have been transmitted during the preceding time interval, determining that the mobile device is not permitted to or should not use the restricted set of MCSs, and otherwise determining that the mobile device is permitted to or should use the restricted set of MCSs.

In yet further alternative embodiments, the step of determining comprises or further comprises determining whether the network node is sending dedicated pilots or reference signals to the mobile device for demodulation of multi-antenna downlink transmissions; in the event that dedicated pilots or reference signals are being transmitted, determining whether the dedicated pilots or reference signals are being transmitted with restrictions; in the event that the dedicated pilots or reference signals are not being transmitted with restrictions, determining that the mobile device is not permitted to or should not use the restricted set of MCSs, and otherwise determining that the mobile device is permitted to or should use the restricted set of MCSs.

In a network where reference signals are used, the reference signals may be any of UE specific reference signals, dedicated reference signals, CSI reference signals (CSI-RS) and demodulation reference signals (DMRS).

In some embodiments, the method further comprises the step of obtaining information on the capability of the mobile device, the capability information indicating whether the mobile device is capable of determining to use an unrestricted set of MCSs or a restricted set of MCSs when performing link adaptation for the multi-antenna downlink transmission and performing the link adaptation to select the MCS for the multi-antenna downlink transmission using the unrestricted or restricted set of MCSs based on the determination. The method may further comprise the step of performing one or more radio operation tasks based on the obtained information.

In some embodiments, the method further comprises the step of receiving information on the set of MCSs used to perform link adaptation from the mobile device. The method may further comprises the step of performing one or more radio operation tasks based on the received information.

According to a fourth aspect of the invention, there is provided a network node for use in a mobile communication network, the mobile network comprising a mobile device configured to receive multi-antenna downlink transmissions from the network, the mobile device being configured to perform link adaptation to select a suitable modulation and/or coding scheme, MCS, from a plurality of available modulation and/or coding schemes, MCSs, for the multi-antenna downlink transmission, the network node comprising a communication module for communicating with the mobile device; and a processing module configured to determine whether the mobile device is permitted to or should use a restricted set of MCSs when performing link adaptation for the multi-antenna downlink transmission, the restricted set comprising a subset of the plurality of available MCSs; and send a signal to the mobile device using the communication module indicating that the mobile device is permitted to or should use the restricted set of MCSs in the event that it is determined that the mobile device is permitted to or should use a restricted set of MCSs when performing link adaptation.

Embodiments of the network node are contemplated in which the processing module is further configured to operate so as to perform the various embodiments of the method of operating the network node described above.

According to a fifth aspect of the invention, there is provided a computer program product comprising computer readable code embodied therein, the computer readable code being configured such that, on execution by a suitable computer or processing module, the computer or processing module is configured to perform any of the methods described above.

BRIEF DESCRIPTION OF THE DRAWINGS

Embodiments will now be described, by way of example only, with reference to the following drawings, in which.

DETAILED DESCRIPTION

Although embodiments described below refer to a mobile communications network using HSDPA in which dedicated pilots may be transmitted, it will be appreciated that the invention is applicable to other types of network in which downlink transmissions to a mobile device can be made with multiple (and particularly four or more) antennas. For example, the invention is also applicable to networks using LTE. The LTE equivalent of dedicated pilots are known as UE specific reference signals, dedicated reference signals, CSI reference signals (CSI-RS) or demodulation reference signals (DMRS).

Figure 10:
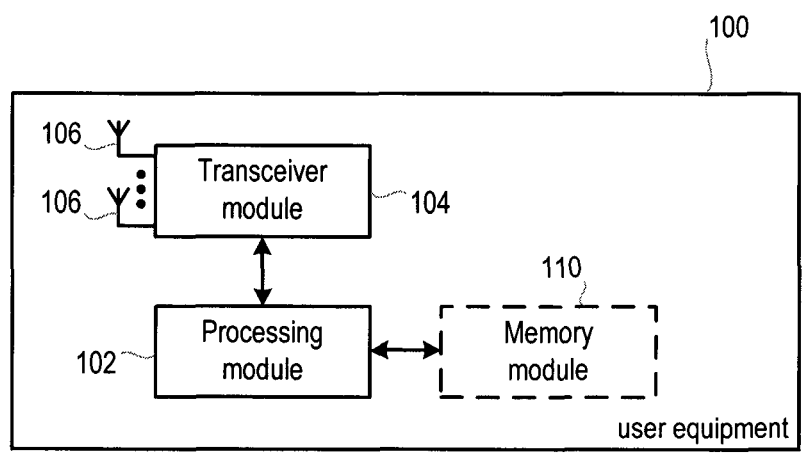
FIG. 10 is a block diagram of a user equipment.

FIG. 10 shows a mobile device 100 (hereinafter UE) that can be used in one or more of the embodiments described below. The UE 100 comprises a processing module 102 that controls the operation of the UE 100. The processing module 102 is connected to a transceiver module 104 with two or more associated antennas 106 which are used to receive signals from the base stations/Node Bs in the network. Typically the UE 100 will comprise two or four antennas 106 such that the UE 100 is capable of operating in a 4×2 or 4×4 MIMO configuration respectively. The user equipment 100 may also comprise a memory module 110 that is connected to the processing module 102 and that stores information and data required for the operation of the UE 100, including computer readable instructions for controlling the UE 100 according to embodiments of the invention, the precoding codebook as defined in TS 3GPP 25.212, Version 11.3 (or as defined in subsequent versions of the standard), look-up tables, and data received from the network and data to be transmitted over the network.

Figure 1:
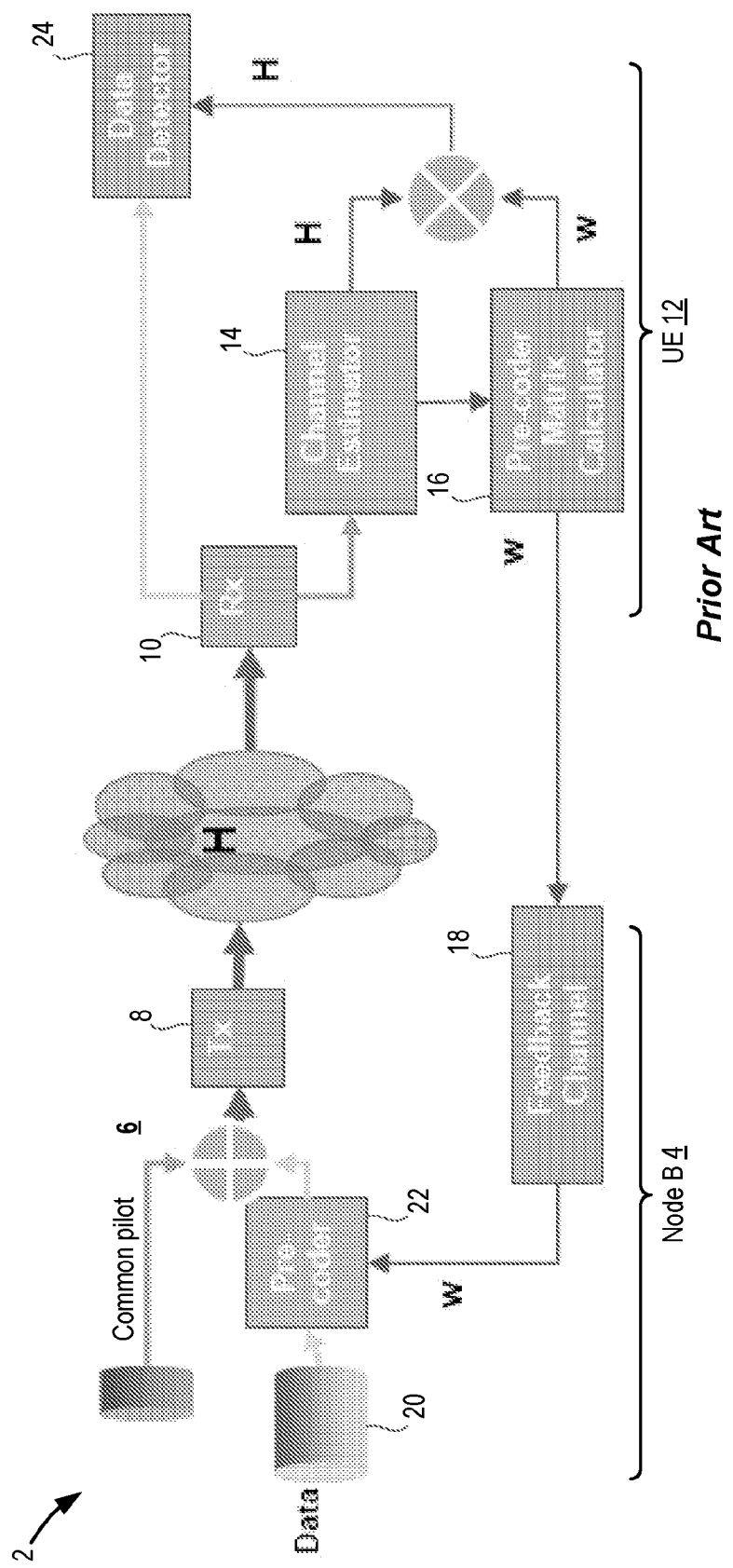
FIG. 1 illustrates a system that uses common pilots for CSI estimation and data demodulation.
Figure 2:
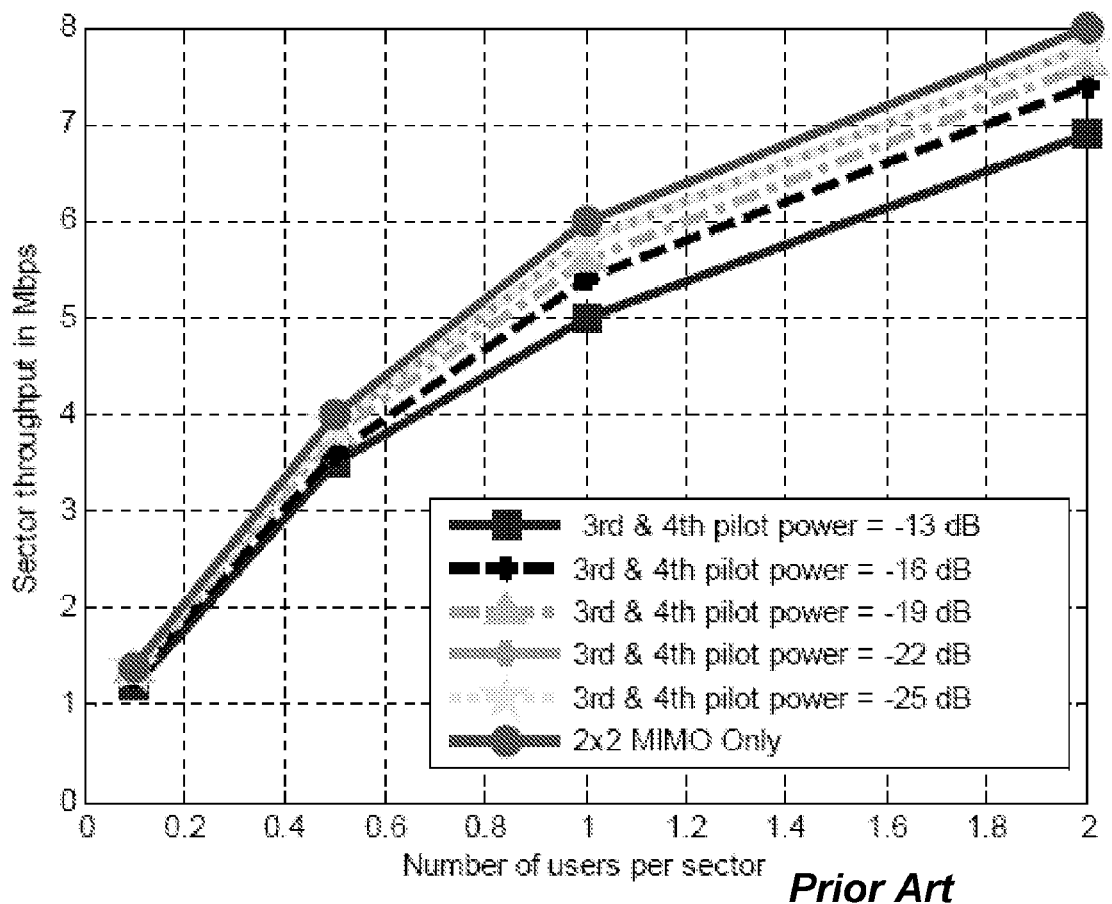
FIG. 2 is a graph illustrating the performance of a pilot reduction scheme on the sector throughput with different numbers of users per sector.
Figure 3:
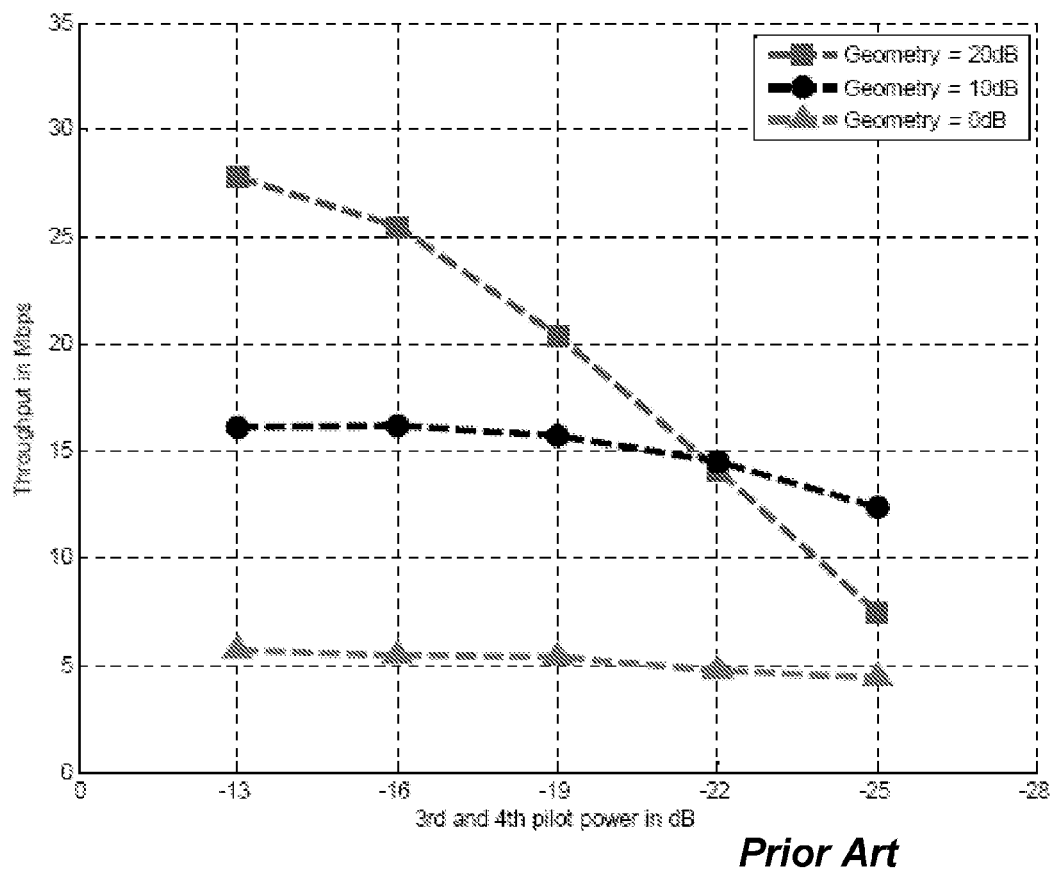
FIG. 3 is a graph illustrating the link level throughput for a UE with three different carrier-to-interference (C/I) ratios for 4×4 MIMO.
Figure 4:
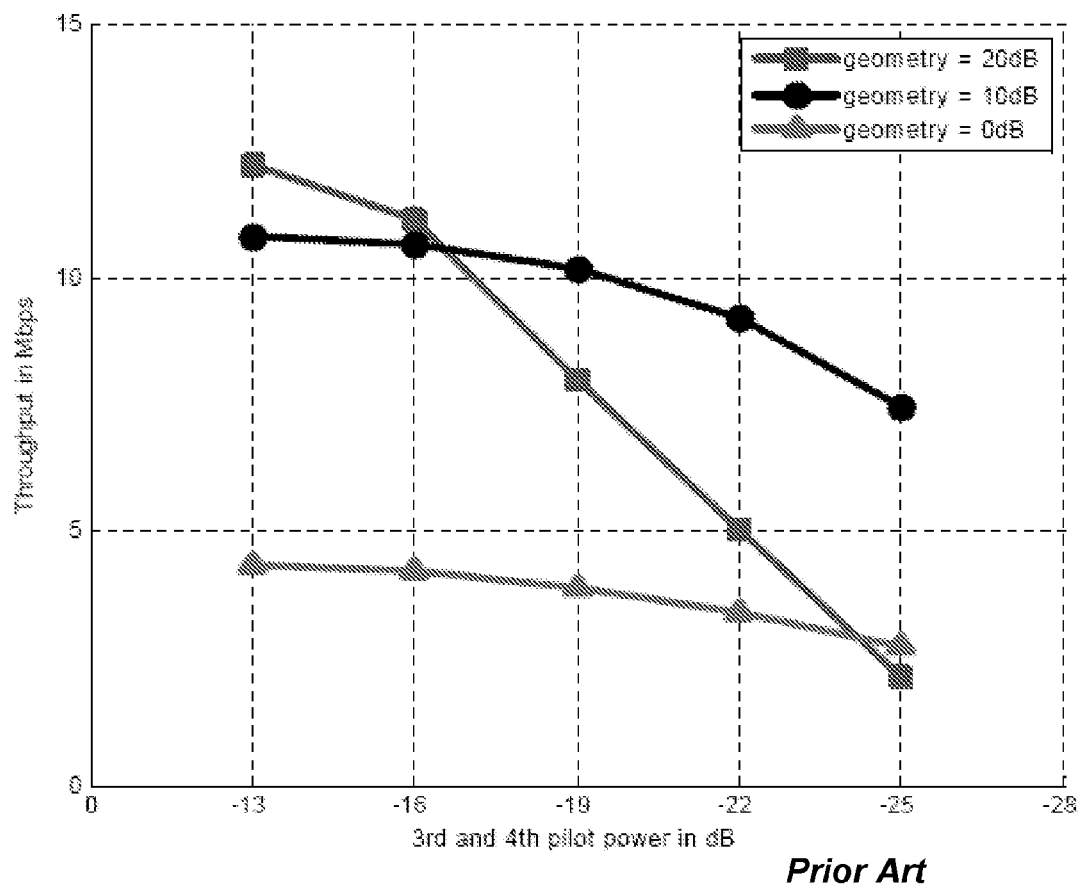
FIG. 4 is a graph illustrating the link level throughput for a UE with three different carrier-to-interference (C/I) ratios for 4×2 MIMO.
Figure 5:
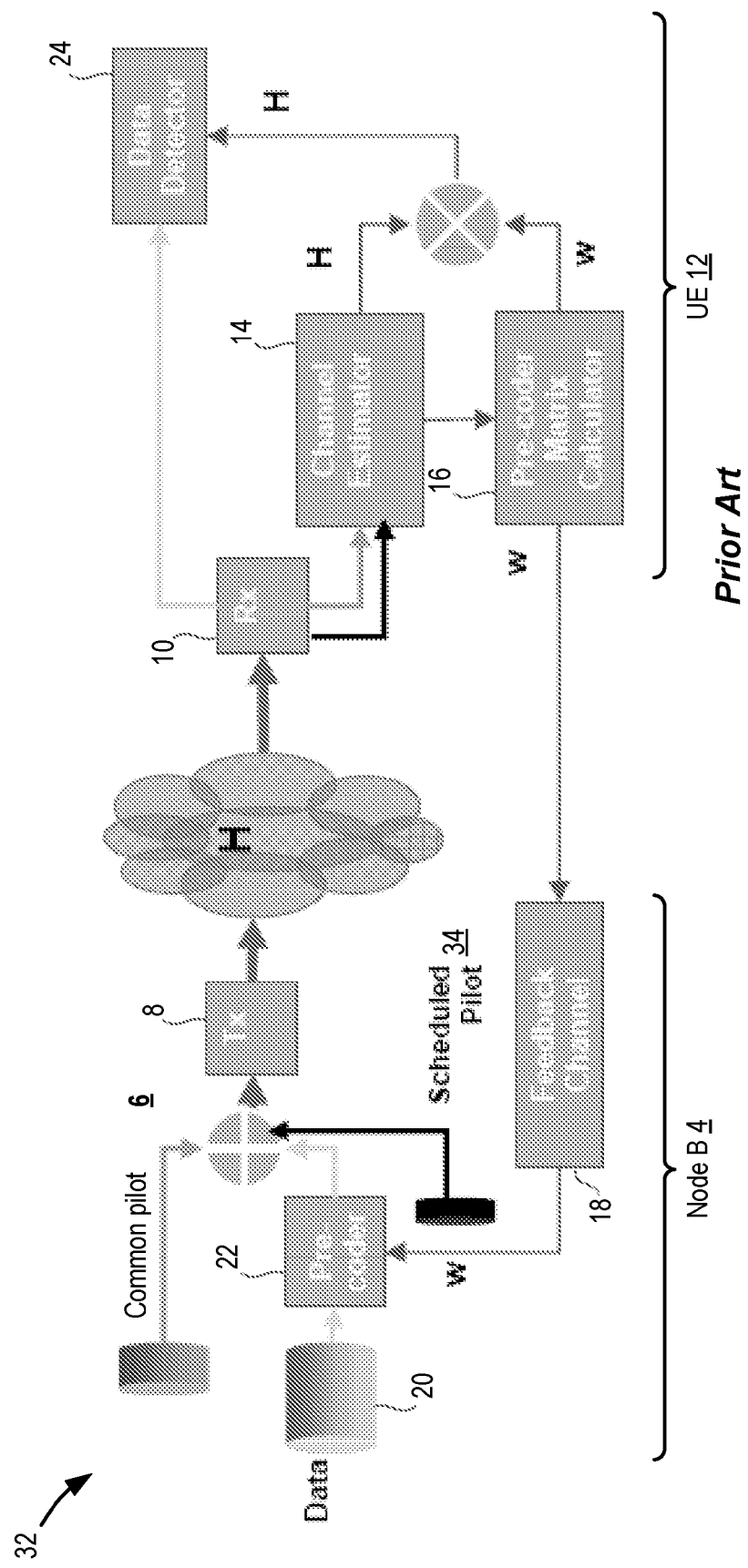
FIG. 5 illustrates a system that uses common pilots for CSI estimation and additional pilots for data demodulation.
Figure 6:
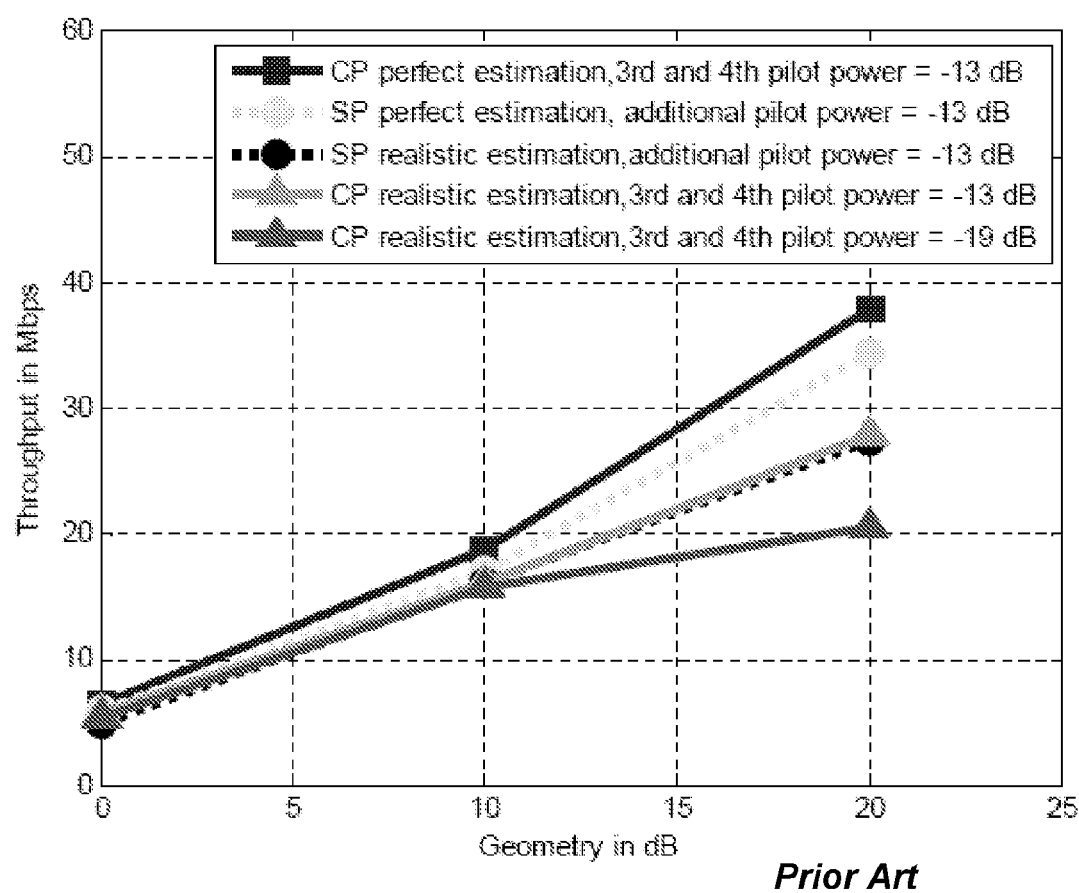
FIG. 6 is a graph illustrating the link level performance for a system using common pilots for CSI estimation and scheduled pilots for data demodulation.
Figure 7:
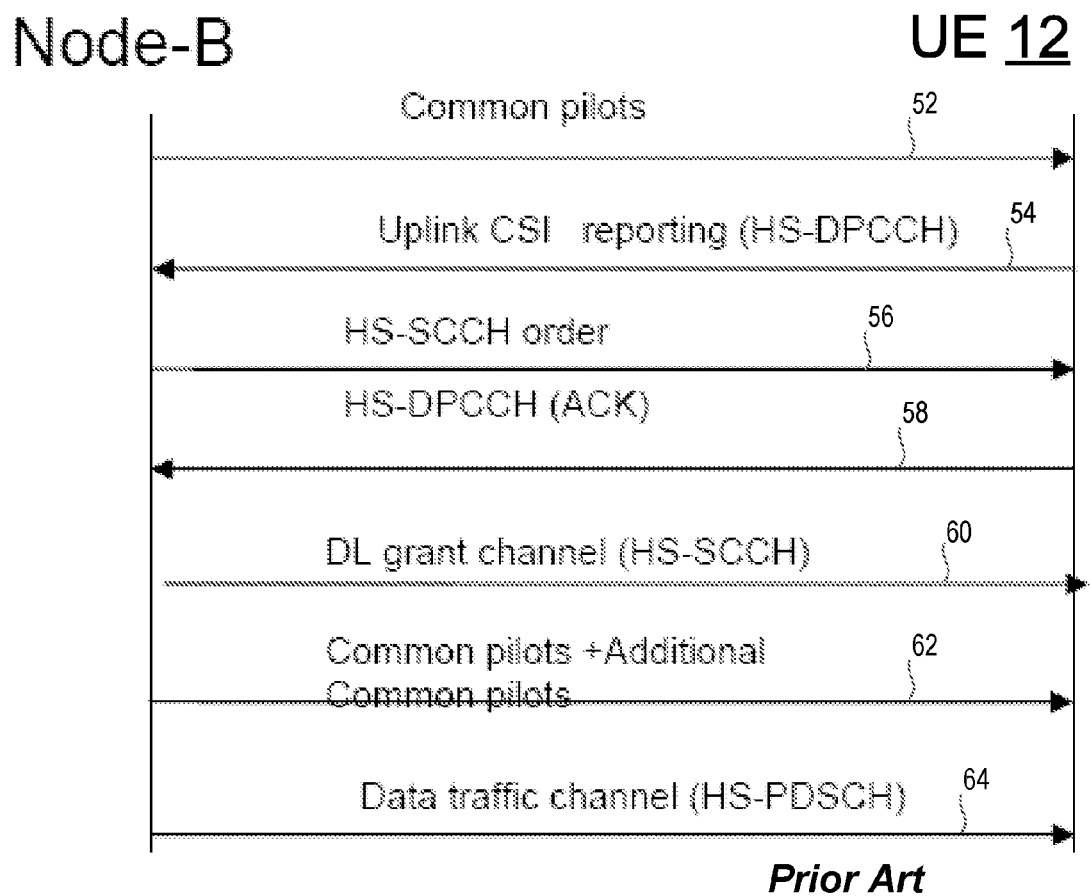
FIG. 7 a signalling diagram indicating how demodulation pilot information is provided to a UE.
Figure 8:
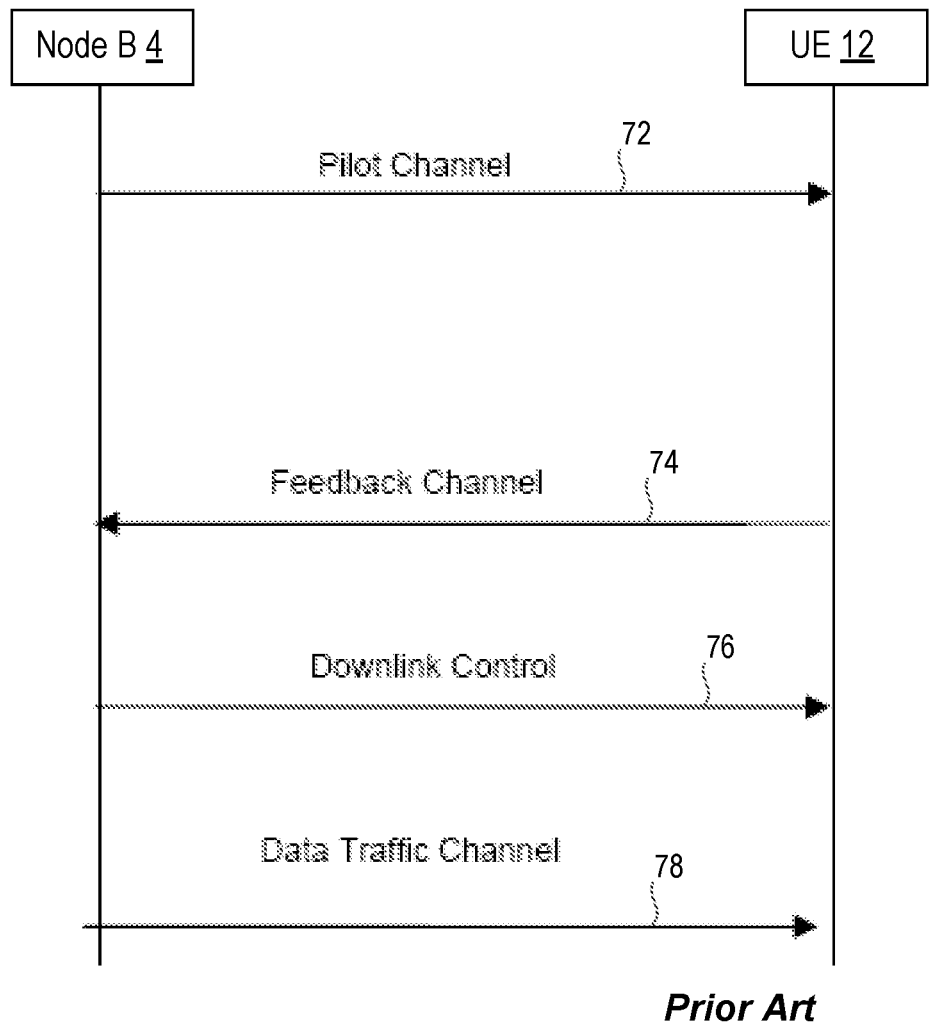
FIG. 8 is a diagram indicating a message sequence chart for HSDPA wireless communications.
Figure 9:
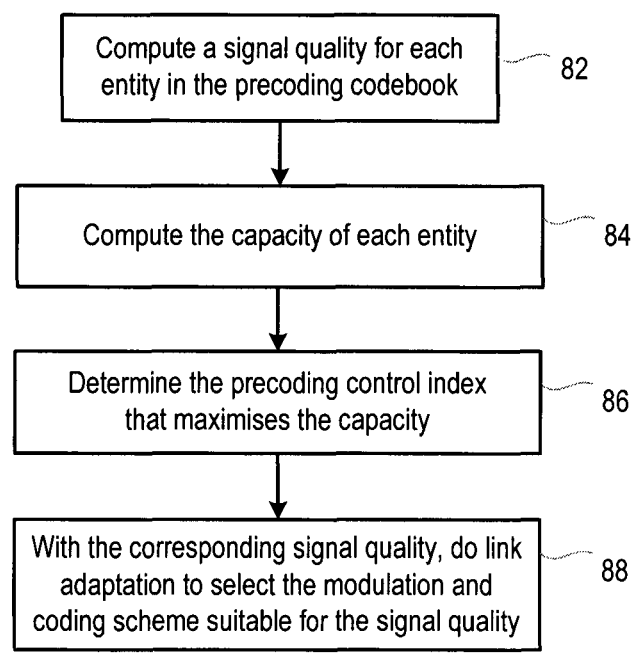
FIG. 9 is a flow chart illustrating a conventional method of determining CSI information.

The UE 100 is for use in a MIMO system such as that shown in FIG. 5 in which a base station can selectively transmit dedicated or scheduled pilots to assist the UE 100 with data demodulation. As such, it will be appreciated that the processing module 102 will be configured to implement at least the channel estimation function 14, pre-coder matrix calculation function 16 and data detection function 24 shown in the UE 12 of FIG. 5.

The UE 100 may be any type of wireless device operating in a wireless communication system, such as a smart phone, a personal digital assistant (PDA), a machine-2-machine (M2M) device, machine-type communication, a target device, a device used for fixed wireless access (FWA), a tablet computer, a mobile terminal, a wireless device for device-to-device (D2) communication, a mobile relay, etc.

Figure 11:
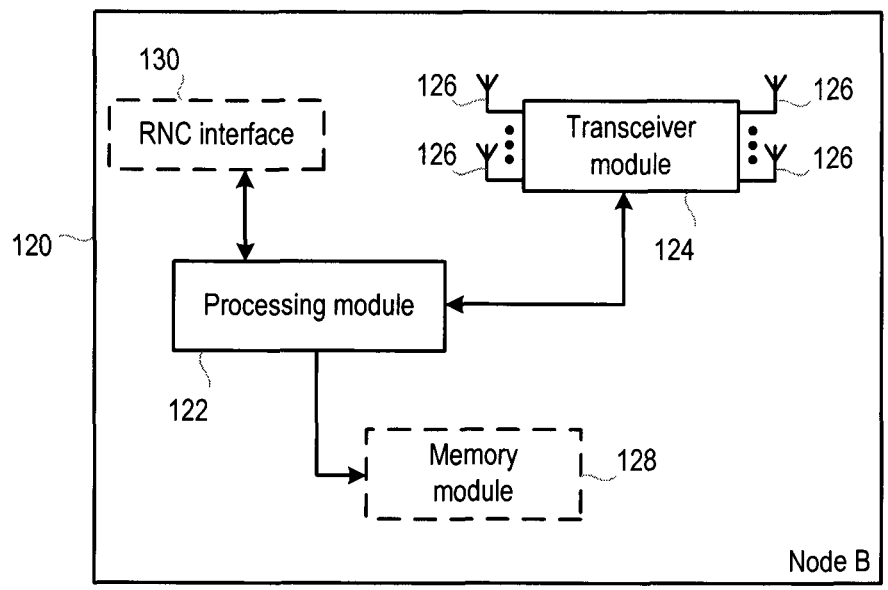
FIG. 11 is a block diagram of a base station.

FIG. 11 shows a base station 120 (hereinafter Node B) that can be used in one or more of the embodiments described below. The Node B 120 comprises a processing module 122 that controls the operation of the Node B 120. The processing module 122 is connected to a transceiver module 124 with at least four antennas 126 which are used to transmit signals to, and receive signals from, UEs 100 in the network. The Node B 120 may also comprise a memory module 128 that is connected to the processing module 122 and that stores information and data required for the operation of the Node B 120, including computer readable instructions for controlling the Node B 120 according to embodiments of the invention, the precoding codebook as defined in TS 3GPP 25.212, Version 11.3 (or as defined in subsequent versions of the standard), look-up tables, symbols and data for common pilot and scheduled pilot signals to be transmitted by the Node B 120 and user data to be transmitted over the network to the UE 100. The Node B 120 may also include components and/or circuitry 130 for allowing the Node B to exchange information with another node in the network, for example a Radio Network Controller, RNC, which controls the Node B 120 and manages radio resources and mobility in the cell defined by the Node B 120.

The Node B 120 is for use in a MIMO system such as that shown in FIG. 5 in which the Node B 120 can selectively transmit dedicated or scheduled pilots to assist the UE 100 with data demodulation. As such, it will be appreciated that the processing module 122 will be configured to implement at least the pre-coder function 22 and control functions shown in Node B 4 of FIG. 5 and as described above with reference to that figure.

The base station 120 can be any type of radio network node operating in a wireless communication system, such as radio base station, a Node B (as described above), a multi-standard radio (MSR), a base transceiver station (BTS), a relay, any donor radio network node controlling relay node, a remote radio head (RRH), a remote radio unit (RRU), any radio network node in a distributed antenna system (e.g. coordinated multipoint transmission and/or reception (CoMP), HSDPA multiflow, LTE multiflow etc). The method of transmitting multi-antenna downlink transmission and additional signals to the mobile device is typically implemented in the serving network node, which serves the mobile device. However the method can also be implemented in all network nodes involved in communication with the mobile device in addition to the serving or primary network node e.g. non-serving network nodes involved in soft handover, transmission points or network nodes involved in CoMP, transmission points or network nodes involved in multi-carrier operation or any combination thereof.

Figure 12:
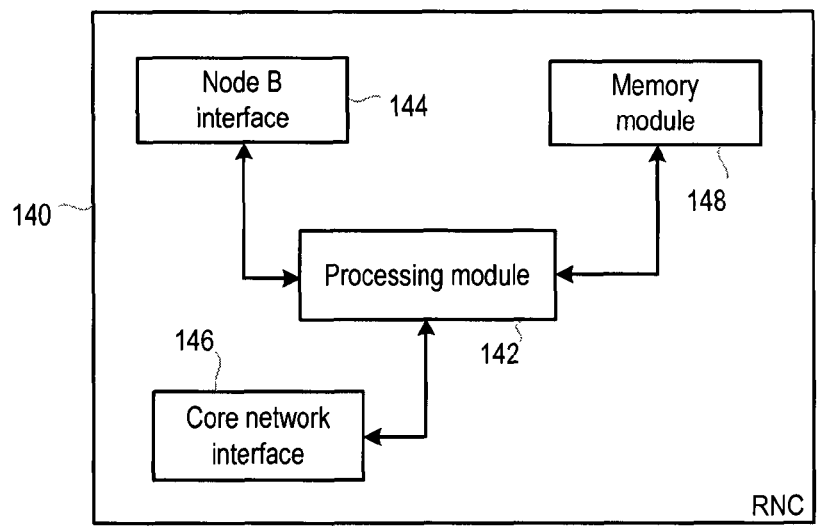
FIG. 12 is a block diagram of a radio network controller.

FIG. 12 shows the components of a network node 140, such as a radio network controller (RNC) that can be used in one or more of the embodiments described below. The RNC 140 comprises a processing module 142 that controls the operation of the RNC 140. The processing module 142 is connected to components and/or circuitry 144 for allowing the RNC 140 to exchange information with Node B 120 with which it is associated (which is typically via the Iub interface), and components or circuitry 146 for allowing the RNC 140 to exchange information with the core network (which is typically via the Iu-CS and/or Iu-PS interface). The RNC 140 also comprises a memory module 148 that is connected to the processing module 142 and that stores information and data required for the operation of the RNC 140, including computer readable instructions for controlling the RNC 140 according to embodiments of the invention.

The network node 140 can be any type of network node operating in a wireless communication system, for example an RNC (as described above) or a base station controller (BSC).

It will be appreciated that, for simplicity, only components of the UE 100, Node B 120 and RNC 140 required to illustrate the embodiments described below are shown in FIGS. 10, 11 and 12.

Briefly, the invention provides a way of operating a mobile device having downlink multi-antenna capability that can perform link adaptation using only common pilots received from the base station and that provides improved performance over conventional link adaptation methods used when demodulation pilots are not available.

As is known, a link adaptation algorithm is performed by UEs in which the radio conditions are evaluated and an appropriate modulation and coding scheme (MCS) for the radio conditions is selected for the downlink data transmission.

In accordance with the invention, when demodulation pilots (in an HSPDA network) or dedicated reference signals (in an LTE network) are not available (or in some cases when the demodulation pilots/dedicated reference signals are available but are being transmitted with restrictions) and/or when other criteria (described in more detail below) are met, the UE 100 performs the link adaptation algorithm to select the MCS from a reduced or restricted set of the possible set of modulation and coding schemes available for use by the UE 100. When demodulation pilots/dedicated reference signals are available and/or if certain other criteria are not met, then the UE 100 performs the link adaptation algorithm to select the MCS from an unrestricted set of the modulation and coding schemes available for use by the UE 100. As the restricted set typically comprises the more robust MCSs, use of the restricted set therefore leads to better reception performance. This in turn enables the UE to more easily decode the data even in the absence of dedicated pilots/dedicated reference signals, reduces the number of retransmissions and therefore enhances the system performance e.g. improves the user and/or system throughputs, and also reduces overheads due to feedback signalling.

As an example, the complete (i.e. unrestricted) set of modulation and coding schemes available to a UE 100 may comprise QPSK, 16QAM and 64QAM, and a restricted set (i.e. a subset of the unrestricted set where one or more schemes in the unrestricted set are omitted) for use when demodulation pilots/dedicated reference signals are not available and/or if certain other criteria are met may comprise only QPSK and 16QAM (i.e. 64QAM is not available for selection by the link adaptation algorithm in this situation). As an alternative, the restricted set may comprise only QPSK (i.e. 16QAM and 64QAM are not available for selection by the link adaptation algorithm).

The selection of a particular modulation type and/or coding rate from the set depends upon signal quality and on the transport block size. For example if signal quality is low (e.g. below a threshold) then the UE may select a more robust modulation e.g. QPSK and accordingly derive the corresponding CQI value and report it to the network node. Similarly if signal quality is low (e.g. below a threshold) then the UE may select a low code e.g. 1/2 or 1/3 instead of 2/3 for deriving the CQI. The network node uses the UE reported CQI for selecting the most appropriate transport format for the downlink transmission to this UE. A transport block or data block using MCS comprising of more robust modulation and/or lower code rate can be decoded more easily by the UE. On the other hand if the signal quality is good (e.g. above a threshold) then the UE may select a less robust modulation e.g. 16 QAM or 64 QAM for deriving the CQI value. If both signal quality are good and transport block size is large then the network may use both less robust modulation (e.g. 16 QAM) and also higher code rate (e.g. 2/3) in order to transmit large transport block or data block to the UE. This in turn enables the network to schedule larger amounts of data to the UE in a shorter time thereby enhancing the user throughput and also the system performance.

Figure 13:
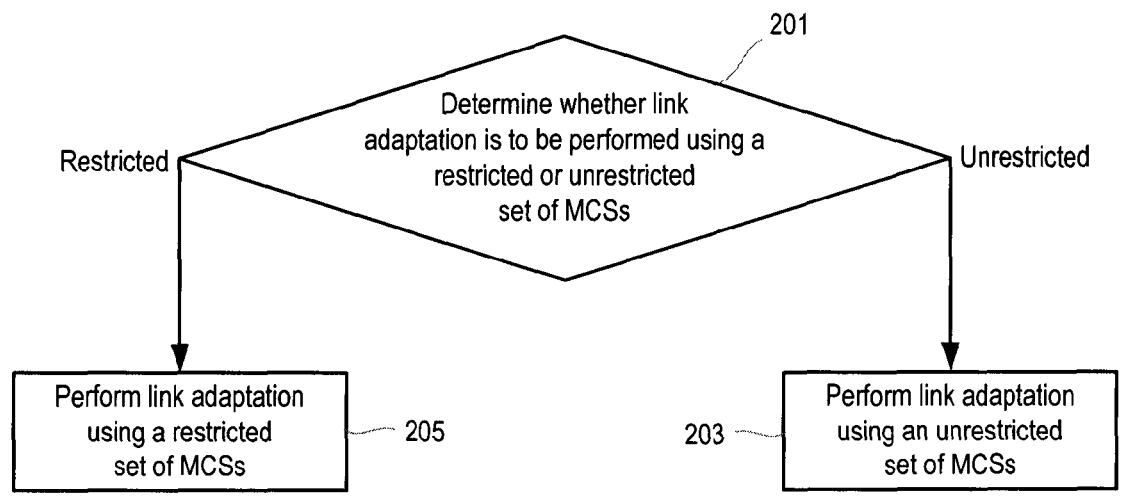
FIG. 13 is a flow chart illustrating a method of operating a UE in accordance with an embodiment.

FIG. 13 illustrates a method of operating a UE 100 in accordance with an embodiment of the invention. This method is for use by a UE 100 in a 4-branch MIMO system, but it will be appreciated that the method is also applicable to MIMO systems using more than 4 branch antennas e.g. an 8-branch MIMO system and so on.

In a first step, step 201, when the UE 100 is to perform link adaptation to determine a modulation and coding scheme to use for downlink transmission (which is something that the UE 100 typically performs many times per second), the UE 100 determines whether the link adaptation is to be performed using an unrestricted set of the modulation and coding schemes (MCSs)—i.e. whether the link adaptation algorithm is to evaluate all of the possible MCSs to select the most appropriate one for the transmission—or whether the link adaptation is to be performed using a restricted set of the MCSs.

As described in more detail below, step 201 can comprise the UE 100 (in particular the processing module 102 of the UE 100) evaluating one or more criteria based on the radio conditions to determine whether to use an unrestricted or restricted set of MCSs in the link adaptation (in which case the UE 100 performs step 201 autonomously, i.e. independently of the control of the Node B 120 or RNC 140). In some embodiments, this evaluation by the UE 100 follows receipt of a signal from the serving Node B 120 or RNC 140 indicating that the UE 100 is permitted to use a restricted set of MCSs when performing link adaptation if the one or more criteria are met. In other embodiments, step 201 can comprise receiving a signal from a node in the network (for example from the serving Node B 120 or the RNC 140) specifically instructing the UE 100 to use an unrestricted set of MCSs or a restricted set of MCSs for the next link adaptation.

In either case, if it is determined that the UE 100 is to use an unrestricted set of MCSs, the method moves to step 203 and the UE 100 performs link adaption using the unrestricted set of MCSs. Likewise, if it is determined that the UE 100 is to use a restricted set of MCSs, the method moves to step 205 and the UE 100 performs link adaption using the restricted set of MCSs.

Figure 14:
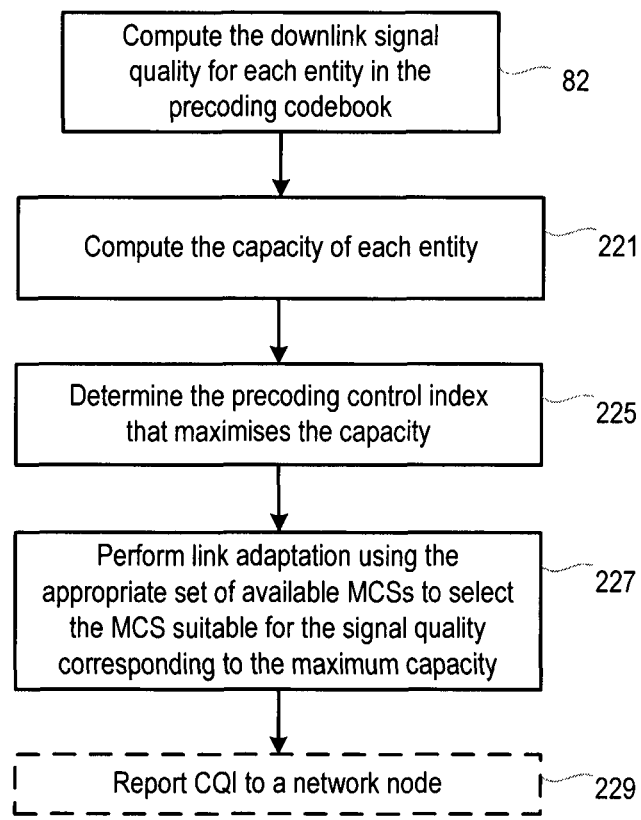
FIG. 14 is a flow chart illustrating a method of operating a UE to select a modulation and coding scheme in accordance with an embodiment.

FIG. 14 is a flow chart illustrating a method of operating the UE 100 to compute channel state information (CSI) from the common pilots transmitted by the Node B 120 and to select the modulation and coding scheme for the downlink transmission in accordance with an embodiment. In some embodiments, this method is performed by the processing module 102 following the determination in step 201 as to whether a restricted or unrestricted set of MCSs is to be used for link adaptation. In other embodiments, the method in FIG. 13 to determine whether to use a restricted or unrestricted set of MCSs in performing link adaptation can be performed as part of, or immediately before, the final step (step 227) in the method of FIG. 14.

The method in FIG. 14 is typically performed during a transmission time interval (TTI) during which the UE 100 is required to apply link adaptation and/or estimate CSI, etc.

In the first step, step 221, the UE 100 computes a signal quality from the common pilot signal for each entity in the precoding codebook. The signal quality may be the SNR, CQI, SINR, BLER, BER, ACK/NACK for DL signal reception, CPICH measurements (CPICH RSCP, CPICH Ec/No), etc. The precoding codebook is specified in TS 3GPP 25.212, Version 11.3. For a 4-branch MIMO system, the precoding codebook consists of rank-1, rank-2, rank-3 and rank-4 transmissions.

Next, in step 223, the UE 100 computes the capacity of each entity. For example, the UE 100 can compute the capacity (C) of each entity in terms of user bit rate, which is determined from the function which maps the downlink signal quality (Q) to the user bit rate (B). A general expression for such a function can be expressed as follows:

$$C = f(\alpha Q)$$

or $$B = g(\alpha Q)$$

where $\alpha$ is a weighting factor which may depend upon receiver characteristic of the UE 100. If the signal quality is the SNR, the capacity can be computed using the formula: capacity, $C = \log 2 (1+SNR)$.

In step 225, the UE 100 identifies the precoding control index (PCI) that maximizes the capacity from the signal quality to precoding codebook mapping determined in step 221.

Then, in step 227, for the signal quality (e.g. SNR) corresponding to the maximum capacity identified in step 225, the UE 100 performs link adaptation to select the modulation and coding scheme (MCS) which is most suitable for this signal quality from either the restricted set or unrestricted set of MCSs as determined by the method in FIG. 13.

In other words, where the method of FIG. 13 determines that link adaptation is to be performed using an unrestricted set of MCSs (i.e. the complete set of all available MCSs), step 227 performs link adaptation and selects the MCS for the downlink transmission from the unrestricted set of MCSs according to the signal quality corresponding to the maximum capacity. Where the method of FIG. 13 determines that link adaptation is to be performed using a restricted set of MCSs (i.e. a subset of the unrestricted set of all available MCSs, where at least one MCS from the unrestricted set is excluded), step 227 performs link adaptation and selects the MCS for the downlink transmission from the restricted set of MCSs according to the signal quality corresponding to the maximum capacity.

Step 227 can be performed using a look-up table (known as CQI tables) which maps different values of the signal quality (e.g. SNR) to the appropriate MCS. Thus, it will be appreciated that respective look-up tables can be provided for link adaptation with the unrestricted set and for link adaptation with the restricted set.

After step 227 has been completed, the chosen CQI, PCI, RI and MCS are reported to the network (i.e. the Node B 120 or the RNC 140) by a feedback channel (step 229).

As indicated above, when the UE 100 is responsible for determining whether to use an unrestricted or restricted set of MCSs when performing link adaptation, various criteria or rules can be evaluated in step 201 to determine whether to use the unrestricted or restricted set. Various exemplary criteria or rules are explained below with reference to the flow charts in FIG. 15.

In a first implementation, described with reference to FIG. 15(*a*), the UE 100 must be operating with at least 4-branch MIMO (step 231) and a signal quality must meet a predetermined requirement (in this example by being above a threshold value—but it will be appreciated that this depends on the specific signal quality measure being used) (step 233) in order for the UE 100 to use the restricted set of MCSs in link adaptation (step 235). If the UE 100 is not operating with at least 4-branch MIMO, or if the UE 100 is operating with at least 4-branch MIMO but the signal quality does not meet the predetermined requirement (i.e. in this example by being less than the threshold value), then the UE 100 determines that the unrestricted set of MCSs should be used for the link adaptation (step 237).

In preferred embodiments, the signal quality measure evaluated in step 233 is the long term signal quality or geometry factor, G (which is typically long term SNR and corresponds to the ratio of received power from the serving cell to that from neighbouring cells). Other examples of signal quality which can be used are CQI, SINR, SNR, BLER, BER, ACK/NACK for DL signal reception, CPICH measurements (CPICH RSCP, CPICH Ec/No) etc. In this case step 233 comprises determining whether the geometry is greater than a threshold value, $G\_t$, and if so (and the UE 100 is operating with at least 4-branch MIMO), link adaptation is performed using a restricted set of MCSs (step 235). If the geometry G is less than the threshold value $G\_t$, then the link adaptation is performed using an unrestricted set of MCSs (step 237). An exemplary value for the threshold $G\_t$ is −12 dB, although it will be appreciated that other values can be used.

As appreciated by those skilled in the art, a long term signal quality can be determined by a function that uses multiple computed signal quality values; with examples of suitable functions being the mean, median, xth percentile etc.

The geometry threshold, $G\_t$, used by the UE 100 in some embodiments as part of the decision of whether to use a restricted set of MCSs when performing link adaptation could be a pre-defined value, for example specified in a standard, set by a network node serving the UE (i.e. the Node B 120 or RNC 140) or determined by the UE 100 itself.

In some implementations the geometry threshold, $G\_t$, may also or alternatively depend on radio characteristics and/or multi-antenna configuration and/or the antenna transmission mode/scheme. The radio characteristics can be determined based on one or more radio measurements performed by the UE 100 or by the Node B 120 on signals transmitted by the UE 100. For example, different values can be pre-defined, configured or used by the UE 100 depending upon the radio environment, e.g. the threshold can have a larger value in a multipath channel environment and a smaller value in a radio channel environment with a smaller delay spread. The different antenna configurations that could affect the appropriate value of the threshold $G\_t$ are (4×1), (4×2) and (4×4), with for example the threshold $G\_t$ being less for a 4×2 configuration than for a 4×4 configuration. The different antenna transmission modes or schemes that could affect the appropriate value of the threshold $G\_t$ are beamforming, spatial diversity, antenna switching, etc.

A second implementation of the rule or criteria used to determine whether to use an unrestricted or restricted set of MCSs when performing link adaptation is described with reference to FIG. 15(*b*). This rule is similar to that shown in FIG. 15(*a*), in that the UE 100 must be operating with at least 4-branch MIMO (step 231) and a signal quality must meet a predetermined requirement (step 233) in order for the UE 100 to use the restricted set of MCSs in link adaptation. However, this rule imposes an additional requirement that the network (i.e. the Node B 120 or RNC 140) must not be transmitting dedicated pilots (dedicated reference signals in LTE) to the UE 100 to assist with demodulation (step 239) if a restricted set of MCSs is to be used in performing link adaptation (step 235).

Thus, if the UE 100 is not operating with at least 4-branch MIMO and/or if the signal quality does not meet the predetermined requirement and/or if the network is transmitting dedicated pilots to assist the UE 100 with demodulation then the UE 100 determines that the unrestricted set of MCSs should be used for the link adaptation (step 237).

A third implementation of the rule or criteria used to determine whether to use an unrestricted or restricted set of MCSs when performing link adaptation is described with reference to FIG. 15(*c*). This rule is similar to that shown in FIG. 15(*b*), but in this rule the UE 100 can only use the restricted set of MCSs for link adaptation (step 235) if the UE 100 is operating with at least 4-branch MIMO (step 231), a signal quality must meets a predetermined requirement (step 233) and if the network (i.e. the Node B 120 or RNC 140) has not sent any dedicated pilots to assist the UE 100 with demodulation over a predefined time interval (step 241). The predefined time interval could, for example, be defined in terms of TTIs, and a suitable time interval may be the preceding five TTIs, or five TTIs out of any twenty consecutive TTIs.

Thus, if the UE 100 is not operating with at least 4-branch MIMO and/or if the signal quality does not meet the predetermined requirement and/or if the network has transmitted dedicated pilots to assist the UE 100 with demodulation during the predefined preceding time period then the UE 100 determines that the unrestricted set of MCSs should be used for the link adaptation (step 237).

A fourth implementation of the rule or criteria used to determine whether to use an unrestricted or restricted set of MCSs when performing link adaptation is described with reference to FIG. 15(*d*). This rule is similar to that shown in FIG. 15(b), but in this rule, if dedicated pilots are being transmitted (which would lead to link adaptation being performed using an unrestricted set of MCSs according to the rule in FIG. 15(b)), it is checked whether the dedicated pilots are being sent with restricted transmission. This rule provides that the UE 100 can only use the restricted set of MCSs for link adaptation (step 235) if the UE 100 is operating with at least 4-branch MIMO (step 231), a signal quality must meets a predetermined requirement (step 233) and either (i) the network (i.e. the Node B 120 or RNC 140) is not sending dedicated pilots to the UE 100 to assist with demodulation (step 239), or (ii) the network (i.e. the Node B 120 or RNC 140) is sending the dedicated pilots with restricted transmission (step 243). Ways in which the transmission of dedicated pilots can be restricted include transmitting the dedicated pilots at low power (i.e. the signal level of the dedicated pilots is below a threshold) and transmitting the dedicated pilots sparsely or intermittently, for example only in every 4th TTI instead in every TTI, etc.

Thus, if the UE 100 is not operating with at least 4-branch MIMO and/or if the signal quality does not meet the predetermined requirement and/or if the network is sending dedicated pilots with unrestricted transmission to assist the UE 100 with demodulation then the UE 100 determines that the unrestricted set of MCSs should be used for the link adaptation (step 237).

In further embodiments to those described above, it is possible for there to be more than one restricted set of MCSs available for the UE 100, with the selection of the unrestricted set of MCSs or one of the restricted sets of MCSs being based on the evaluation of the one or more criteria. For example, a first restricted set of MCSs could comprise QPSK and 16QAM, and a second restricted set of MCSs could only comprise QPSK.

Figure 15A:
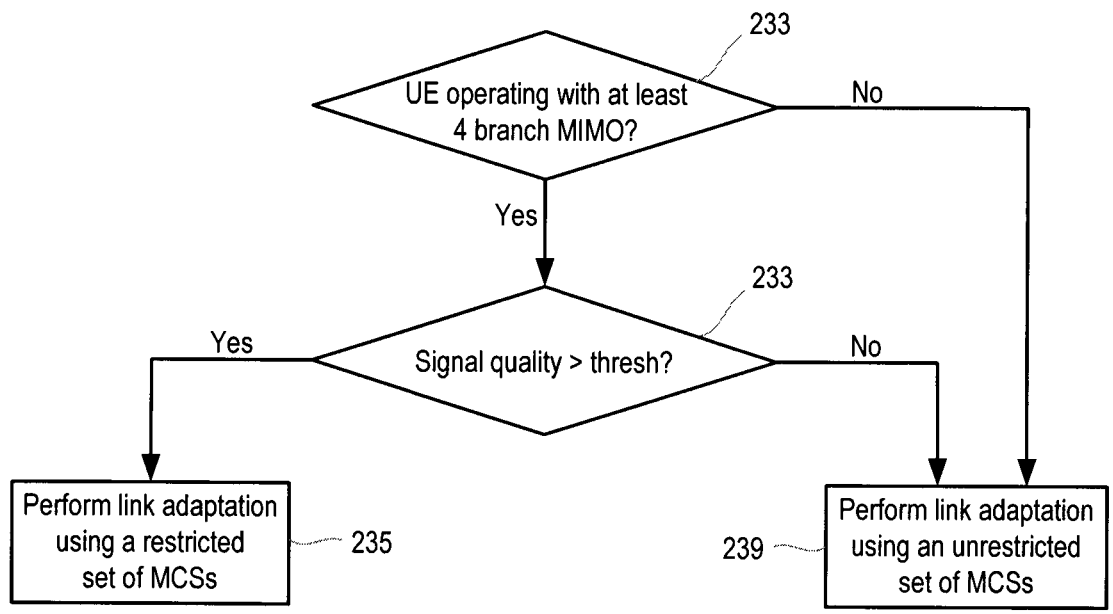
FIGS. 15(a)-(d) are flow charts illustrating criteria that can be used to determine whether to use a restricted or unrestricted set of modulation and coding schemes in the method of FIG. 14.
Figure 15B:
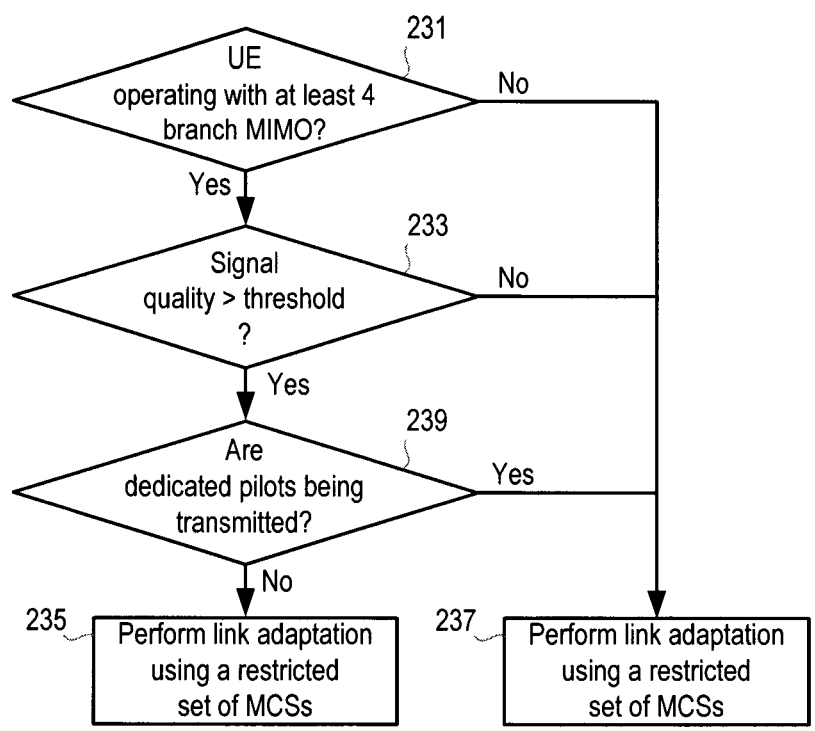
Figure 15C:
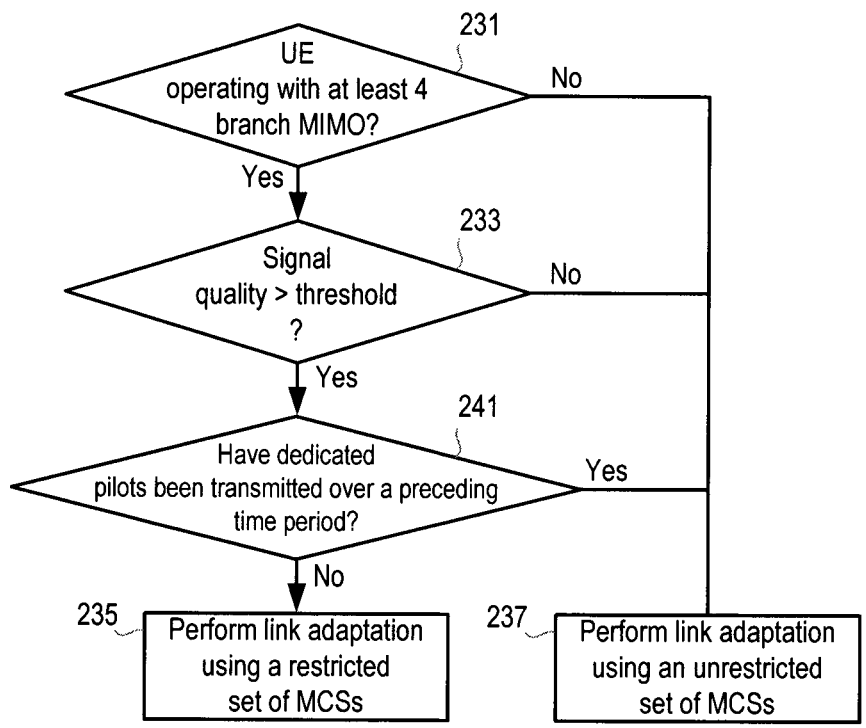
Figure 15D:
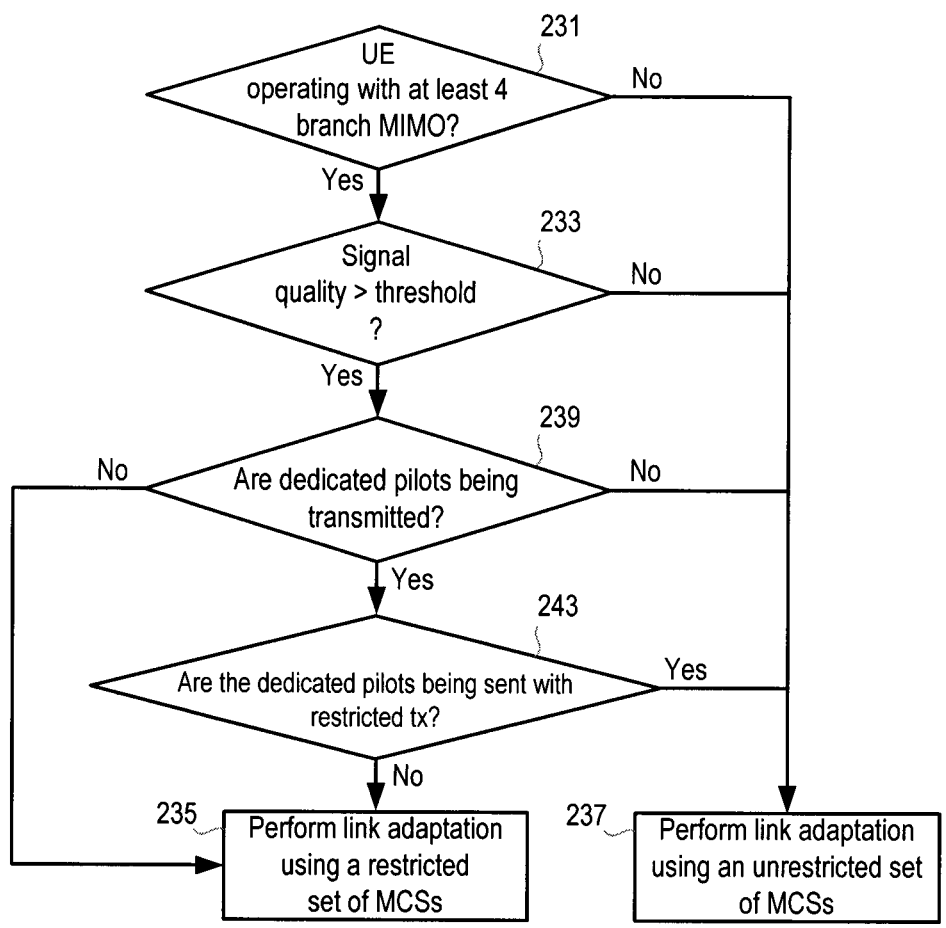

Referring to the example rule shown in FIG. 15(a), two signal quality thresholds may be provided, with the first restricted set of MCSs (comprising QPSK and 16QAM) being selected when the signal quality exceeds the first (lower) threshold but is less than the second (higher) threshold, and the second restricted set of MCSs (comprising QPSK) being selected when the signal quality exceeds the second (higher) threshold. It will be appreciated that the rules shown in FIGS. 15(b)-(d) can be adapted in a similar way.

In the following description of the invention, link adaptation that is performed with a restricted set of MCSs is considered to involve the use of a different 'link adaptation algorithm' to link adaptation that is performed with an unrestricted set of MCSs. This can be understood from the fact that in many implementations performing link adaptation involves the use of a look-up table to map the signal quality to the MCS (step 227 in FIG. 14) and there will be a particular look-up table for use when the set of MCSs is unrestricted and another different look-up table for use when the set of MCSs is restricted. Thus, the situation where the UE 100 changes to using a restricted set of MCSs for link adaptation following previous use of the unrestricted set of MCSs (and vice versa) is referred to as 'switching' between link adaptation algorithms.

Figure 16:
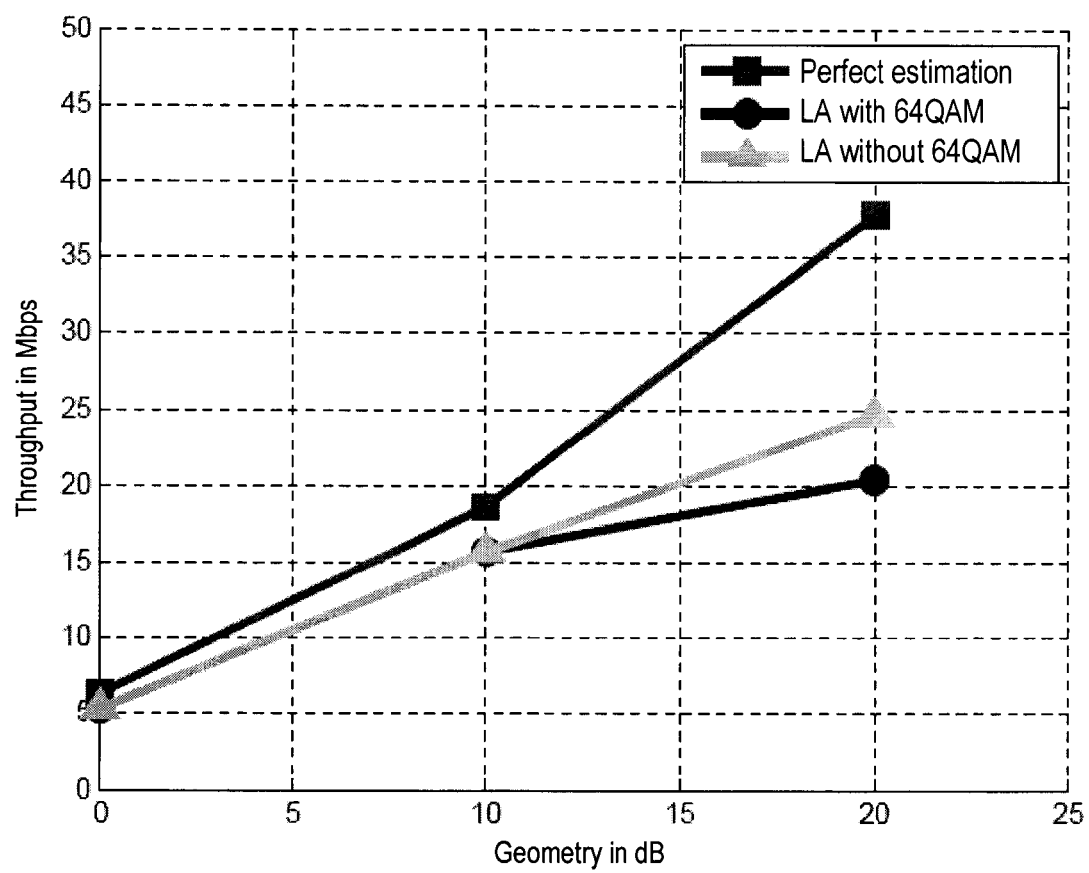
FIG. 16 is a graph comparing the link level performance when restricted and unrestricted sets of modulation and coding schemes are used for link adaptation.

The graph in FIG. 16 compares the link level performance when restricted and unrestricted sets of modulation and coding schemes are used for link adaptation. The impact of reduced pilot power for high data rate applications is shown by plotting the 4×4 MIMO link performance with pilot powers [−10 −13 −19 −19] dB for a link adaptation algorithm that uses an unrestricted set (and in particular a set that includes 64QAM as well as QPSK and 16QAM) and a link adaptation algorithm that uses a restricted set (and in particular a set that includes QPSK and 16QAM but does not include 64QAM). The graph also shows the results with perfect estimation.

It can be observed from this graph that at low and medium geometries the performance of the two link adaptation algorithms is same, while at high geometries the link adaptation algorithm with the restricted set (i.e. without 64 QAM) performs better. The performance degradation with conventional link adaptation (i.e. with the unrestricted set) is around 33% compared to the perfect estimation, whereas the performance degradation is only around 16% for the link adaptation that uses a restricted set of MCSs (i.e. without 64QAM).

Figure 17:
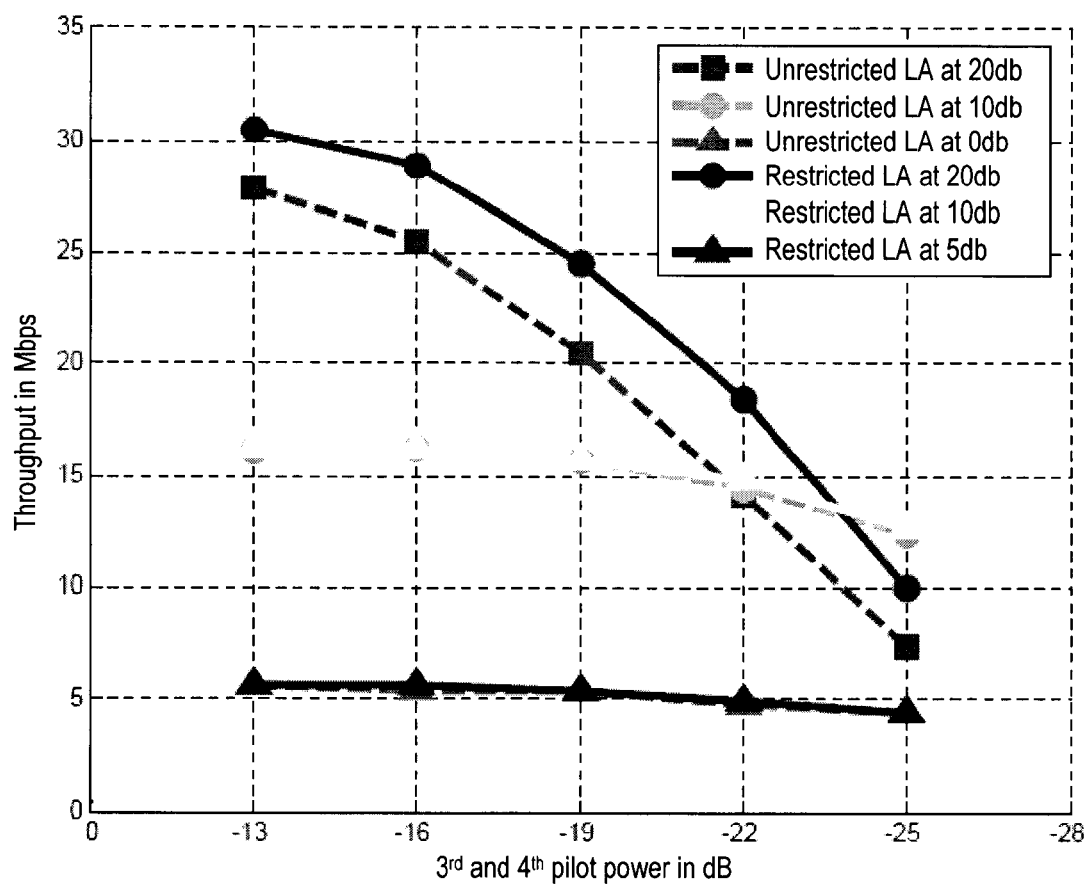
FIG. 17 is a graph comparing the link level performance for three different carrier-to-interference ratios when link adaptation is performed using restricted and unrestricted sets of modulation and coding schemes.

The graph in FIG. 17 shows the link level throughput for a UE 100 with three different carrier-to-interference (C/I) ratios using link adaptation with the restricted set (i.e. without 64 QAM) and link adaptation with the unrestricted set (i.e. including 64QAM). As discussed above in the Background section, when operating with common pilots it is necessary to minimise the power transmitted on the $3^{rd}$ and $4^{th}$ pilots in order to minimise the impact on legacy UEs. The graph plots the performance (throughput) against the pilot powers for the $3^{rd}$ and $4^{th}$ antennas whilst keeping the pilot powers for the $1^{st}$ and $2^{nd}$ antennas as −10 and −13 dB respectively. It can be seen that as the pilot powers are reduced, the performance degrades due to bad channel estimation for CQI and data demodulation. The degradation is severe at high C/I (i.e. the 20 dB lines) compared to low C/I (i.e. the 10 dB and 0 dB lines). When performing link adaptation with the restricted set, the performance degradation is minimal, while at the same time the performance is not impacted at low and medium geometries (it will be noted that the respective lines for the link adaptation with the restricted and unrestricted sets at a C/I of 10 dB generally coincide on the graph, as do the lines for the link adaptation with the restricted and unrestricted sets at a C/I of 0 bB).

Assuming the $3^{rd}$ and $4^{th}$ common pilots are set to −19 dB, then the performance degradation at high geometries with link adaptation that uses the unrestricted set is around 33%, while performance degradation at high geometries with link adaptation that uses the restricted set is around 16%, which is a gain of 16%. Hence, significant gains can be achieved by performing link adaptation with the restricted set.

In some embodiments where the UE 100 is operating using both multi-antennas and carrier aggregation, the ability for the UE 100 to switch between using the restricted and unrestricted sets of MCSs may only be performed on the primary carrier i.e. the primary serving cell, (in which case the UE 100 uses the conventional, unrestricted, set for the secondary carrier(s)) or it may be performed on both the primary carrier and the secondary carrier(s). If the UE 100 is capable of performing switching between the restricted and unrestricted sets on both the primary carrier and secondary carrier(s), the UE 100 may perform switching on any, or on specific applicable, multi-carrier configurations. Examples of information related to multi-carrier configurations include the number of secondary carriers, the type of carrier aggregations (e.g. DC-HSDPA, DB-DC-HSDPA, DC-HSUPA, 4C-HSDPA, 8C-HSDPA etc). It may therefore be predefined whether the UE 100 can determine whether to switch between the restricted and unrestricted sets on a primary carrier or also on a secondary carrier, and/or the types of carrier aggregation for which the UE 100 can determine whether to switch between the restricted and unrestricted sets.

In some embodiments, the UE 100 may be configured to determine whether to switch between sets when operating on a carrier belonging to any of its supported frequency bands. In another embodiment, it may be predefined that the UE 100 can determine whether to perform the switch when operating with multiple-antennas on a carrier which belongs to one or more frequency bands (e.g. UTRA FDD band I, Band III etc). It may be predefined that the UE 100 can determine whether to switch when operating with multiple-antennas on all frequency bands which are within a certain range, for example with a frequency below 1 GHz or with frequencies between 800 MHz to 2 GHz.

Figure 18:
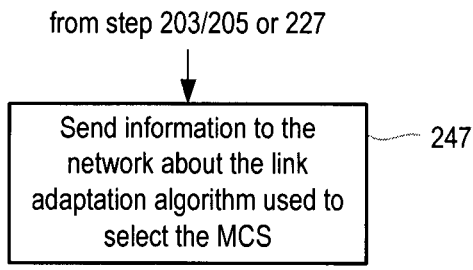
FIG. 18 is a flow chart illustrating an additional step for the method of operating a UE shown in FIGS. 13 and/or 14.

In a further embodiment, illustrated in FIG. 18, the UE 100 may be configured to provide information to the network (for example the RNC 140) indicating the link adaptation algorithm used to select the MCS (i.e. which of the unrestricted set and restricted set of MCSs were used) or indicating whether the UE 100 has switched to using a restricted set from using an unrestricted set (or vice versa).

Thus, following step 203 or 205 in FIG. 13 or step 227 in FIG. 14, the UE sends information to the network about the link adaptation algorithm used to select the MCS (step 247). This information can be sent to the RNC 140 using the radio resource control (RRC) protocol.

The UE 100 may send this information following each iteration of steps 203/205 or 227, or alternatively the UE 100 may only send this information following a change between using the restricted set and the unrestricted set, or when requested to do so by the network. As indicated below, rather than provide information about a specific iteration of the link adaptation (i.e. for one particular TTI), the UE 100 may provide statistics relating to the link adaptation algorithms used over a certain time period.

In addition to the information about the link adaptation algorithm used to select the MCS, the UE 100 can send additional information to the network that is relevant to the link adaptation algorithm selection. For example, the additional information can comprise the signal quality threshold (e.g. G_t) used by the UE 100, the frequency of switching between the algorithms (i.e. between the restricted and unrestricted sets) and/or the number of occurrences of switching over a certain time period, and/or the antenna configuration e.g. (4×2) or (4×4).

Figure 19:
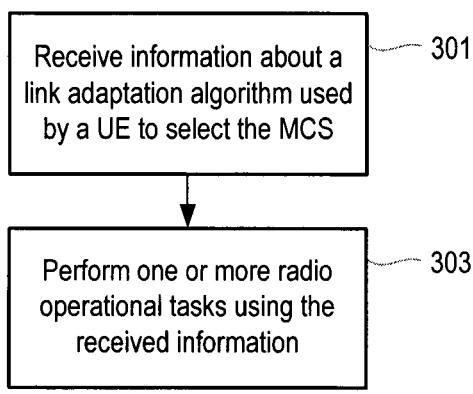
FIG. 19 is a flow chart illustrating a method of operating a node in the network following receipt of the information sent according to the method in FIG. 18.

The flow chart in FIG. 19 illustrates a method of operating a node (for example an RNC 140) in the network following receipt of the information sent according to the method in FIG. 18. In a first step, step 301, the RNC 140 receives the information about the link adaptation algorithm used by a UE 100 to select an MCS. This information can comprise any of the types of information described above with reference to FIG. 18.

Then, in step 303, the network node 140 performs one or more radio operational tasks using or in response to, the received information (step 303).

Exemplary radio operational tasks that can be performed by the network node 140 include:

Determining whether or not to transmit dedicated (scheduled) pilots to the UE 100 when the UE 100 is operating in a multi-antenna (four or higher) mode.

Determining the antenna configuration and/or radio conditions under which dedicated (scheduled) pilots are required to be sent to achieve the desired performance at the UE 100 (e.g. determine the user throughput above a target for a given antenna configuration).

Using statistics on the switching between link adaptation algorithms to configure one or more radio parameters, for example the maximum transmit power for common signals, such as the pilot transmission power.

Forwarding the received statistics to other network nodes (for example nodes in the core network) which may use them for selection of parameters, long term network planning, for example for tuning of system parameters, upgrading the network to use multi-antenna modes, adapting admission control for legacy UEs and/or MIMO UEs, etc. The other network nodes to which these statistics can be forwarded include neighbouring RNCs, base stations (BS), Node Bs, Operational and Maintenance (O&M), Operational Support Systems (OSS), Self Organising Network (SON), Minimisation of drive tests (MDT), etc.

As noted above with reference to FIG. 13, the UE 100 may perform step 201 (i.e. determining whether to perform link adaptation using a restricted or unrestricted set of MCSs) autonomously, i.e. independently of the control of the Node B 120 or RNC 140, by evaluating a predefined rule or criteria. However, in some embodiments, the evaluation by the UE 100 follows receipt of a signal from the serving Node B 120 or RNC 140 indicating that the UE 100 is permitted to use a restricted set of MCSs when performing link adaptation if the one or more criteria are met, and in other embodiments, step 201 can comprise receiving a signal from a node in the network (for example from the serving Node B 120 or the RNC 140) specifically instructing the UE 100 to use an unrestricted set of MCSs or a restricted set of MCSs for the next link adaptation.

Figure 20:
FIG. 20 is a flow chart illustrating a method of operating a node in the network in accordance with an embodiment.

The flow chart in FIG. 20 illustrates a method performed by a network node (e.g. the Node B 120 or RNC 140) in order to determine whether the UE 100 is (in the embodiment described above) permitted to use a restricted set of MCSs when performing link adaptation if the one or more criteria are met or (in the other embodiment described above) should use a restricted set of MCSs when performing link adaptation.

Thus, in a first step, step 401, the network node 120, 140 determines whether a UE 100 is permitted to or should (depending on the embodiment) use a restricted set of MCSs when performing link adaptation.

If it is determined that the UE 100 is not permitted to or should not (depending on the embodiment) use a restricted set of MCSs, the network node 120, 140 sends a suitable signal to the UE 100 indicating this (step 403) or configures the UE 100 accordingly.

However, if it is determined that the UE 100 is permitted to or should (depending on the embodiment) use a restricted set of MCSs, the network node 120, 140 sends a suitable signal to the UE 100 indicating this (step 405) or configures the UE 100 accordingly.

In certain embodiments, step 401 can be performed by the network node 120, 140 by evaluating criteria that are the same or similar to those evaluated by the UE 100 when performing step 201 autonomously and which are described above with reference to FIG. 15.

In some embodiments, the network node 120, 140 may decide whether to permit the UE 100 to switch link adaptation algorithms (or to configure the UE 100 to use a particular link adaptation algorithm) at least in part based on the downlink signal quality or geometry. In this case, the downlink signal quality or geometry measured by the UE 100 may be reported to the network node 120, 140 as described above with reference to FIG. 18, and the network node 120, 140 can compare the signal quality or geometry to a (or the) threshold value, e.g. G_t. As with the embodiments shown in FIG. 15, the threshold value can be determined by the network, it can be predefined (for example in a standard), it can be UE-implementation specific and/or it can depend upon factors such as radio characteristics, multi-antenna configuration etc. In some embodiments, the threshold G_t can have a value of 10 dB.

In other or further embodiments, the network node 120, 140 can decide whether to permit the UE 100 to perform switching between the link adaptation algorithms or to configure the UE 100 such that it uses a particular link adaptation algorithm using any one or more of the following criteria:

- The UE 100 may be required to be using a certain specific antenna configuration e.g. 4×1 or 4×2 for switching to be permitted or instructed.
- The downlink signal quality or geometry factor may need to be above a threshold value in order for switching to be permitted or instructed.
- A certain downlink pilot configuration may be required in order for switching to be permitted or instructed. The downlink pilot configuration may comprise the type of pilots sent by the network such as dedicated pilots, user specific pilots, the transmit power of the pilots, the density and/or frequency of transmission of downlink pilots etc. As an example, the network may permit or require the UE 100 to perform the switching when the network does not send dedicated pilots to the UE 100 to assist in demodulating the received signals. In another example, the network may permit or require the UE 100 to perform switching when the network does not send dedicated pilots to the UE 100 to assist in demodulating the received signals during at least a certain time period (e.g. over 5 consecutive TTIs or over 5 TTIs out of any 20 consecutive TTIs).

The signals sent in steps 403 or 405 can be sent using higher layer signalling and/or lower layer signalling. Examples of higher layer signalling that can be used include layer 3 protocols or message signalling, e.g. RRC. Examples of lower layer signalling are layer 1 and/or layer 2 protocols or message signalling, e.g. medium access control (MAC) protocol data unit (PDU) (L2 signalling), HS-SCCH (L1 signalling).

The signal sent according to step 403 or 405 may be an indicator (e.g. a 1-bit indicator) that informs the UE 100 whether it is permitted to switch between link adaptation algorithms or whether the UE 100 should use a particular link adaptation algorithm (as appropriate depending on the embodiment implemented). It will be appreciated that in the former case where the network node 120, 140 determines whether the UE 100 is permitted to switch between link adaptation algorithms and this is signalled to the UE 100, the actual decision as to the link adaptation algorithm to use in any given TTI will be taken by the UE 100, for example by evaluating the one or more criteria described above with reference to FIG. 15.

In further embodiments, the network node 120, 140 may transmit additional information along with the indication of whether the UE 100 is permitted to or should switch link adaptation algorithms. The additional information may comprise:

- An indication of the modulation and/or coding schemes to be included in the restricted set when the restricted set is to be used. The indication may be provided in the form of an identifier for one or more predefined look-up tables that should be used in the link adaptation algorithm when a restricted set is to be used.
- Timing information relating to when the UE 100 is allowed to perform switching between the link adaptation algorithms. For example, the timing information may specify the duration or time period (e.g. number of TTIs, starting reference time e.g. SFN=0, ending time e.g. SFN=128) over which switching can be performed.
- The antenna configurations for which the UE 100 must be using for switching to be permitted.
- An indication of the number of times the UE 100 is allowed to perform switching during a call or data session, or over certain time duration (T1). The parameter, T1 can be predefined or it can be configured by the network node 120, 140. An exemplary limit on the number of switches between link adaptation algorithms can be 10. An exemplary value for T1 is 200 TTI.

As an alternative to sending a signal according to step 403 (i.e. indicating that the UE 100 is not permitted to or should not use a restricted set of MCSs), the UE 100 may be preconfigured so that it is not able to use a restricted set of MCSs until it receives a positive indication from the network node 120, 140, even when the UE 100 may be operating in a downlink multi-antenna mode (e.g. 4 branch MIMO), the signal quality or geometry is sufficiently high, and/or regardless of whether the dedicated pilots specific to multi-antenna operation are being transmitted or not.

As described above, on receipt of the signal or indication from the network node according to step 403 or 405, the UE 100 completes step 201 of FIG. 13 and determines the channel quality indicators according to the method in FIG. 14.

In a further embodiment, prior to the UE 100 executing the method in FIG. 13 and prior to the network node 120, 140 executing the method in FIG. 20, the UE 100 may be configured to send information to the network node 120, 140 about the capability of the UE 100 to switch between link adaptation algorithms. This is because it is possible that not all UEs operating in a multi-antenna transmission mode (e.g. 4-branch MIMO) may be capable of performing switching between link adaptation algorithms according to the signal quality or when dedicated pilots are not being transmitted or when they are being transmitted but with restrictions.

Figure 21:
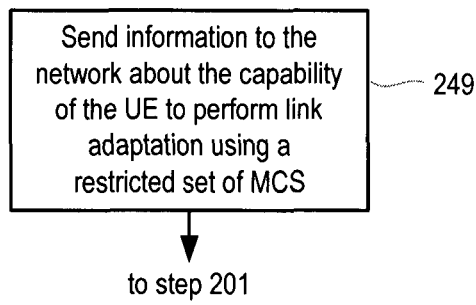
FIG. 21 is a flow chart illustrating an additional step in the method of operating a UE shown in FIGS. 13 and/or 14.

Thus, FIG. 21 shows a step 249 of sending information to the network about the capability of the UE 100 to perform link adaptation using a restricted set of MCSs. This step is performed prior to step 201 in FIG. 13.

In addition to indicating the capability of the UE 100 to perform link adaptation using a restricted set of MCSs (or the ability to switch between link adaptation algorithms that use restricted and unrestricted sets of MCSs, the information transmitted by the UE 100 in step 249 may indicate further information to the network about the UE 100. For example, the additional information can indicate whether the UE 100 is capable of performing autonomous switching between the link adaptation algorithms (e.g. by evaluating the one or more criteria described above with reference to FIG. 15) and/or whether the UE 100 can be directly configured by the network node 120, 140 to use a particular link adaptation algorithm (e.g. as described above with reference to FIG. 20).

The additional information may also include any one or more of:

- The antenna configuration(s), e.g. 4×2, for which the UE 100 is capable of performing switching.
- The antenna transmission mode(s), e.g. beamforming, for which the UE 100 is capable of performing switching.
- The maximum rate or frequency with which the UE 100 can perform antenna switching, e.g. not more than N times over M TTIs; where for example N and M can be 5 and 100 TTIs respectively.

An indication of whether the UE 100 is capable of providing information and/or the type of information related to switching between algorithms to the network node 120, 140 according to the method in FIG. 18.

An indication of whether the UE 100 is capable of using a signal quality threshold, e.g. G_t, that can be adapted to the radio characteristics and/or the multi-antenna configuration of the UE 100 and/or the antenna transmission mode or scheme of the UE 100.

An indication of whether the UE 100 is capable of performing switching (autonomously or network controlled) only on a primary carrier or on both a primary carrier and secondary carrier(s) when operating using both multi-antennas and carrier aggregation. In the case where the UE 100 is capable of performing switching on both primary and secondary carriers, the UE 100 may also indicate information associated with the applicable multi-carrier configurations. Exemplary information relating to multi-carrier configurations that can be provided includes the number of secondary carriers and/or the type of carrier aggregations (e.g. DC-HSDPA, DB-DC-HSDPA, DC-HSUPA, 4C-HSDPA, 8C-HSDPA etc).

An indication of one or more frequency bands (e.g. UTRA FDD band I, Band III etc) on whose carriers the UE 100 is capable of performing switching between link adaptation algorithms.

An indication of the related frequency range (e.g. with frequency below 1 GHz or with frequencies between 800 MHz to 2 GHz) over which the UE 100 operates in which it can perform switching.

The UE 100 may send the above-mentioned capability information to the network node 120, 140 according to step 249 in a number of different circumstances. For example, the UE 100 can transmit the information proactively without receiving any explicit request from the network node 120, 140. Alternatively it can be transmitted upon receiving an explicit request from the network node 120, 140 for the information. In either case, the proactive reporting or request from the network can occur at any time, or on occurrence of specified events, for example during initial setup of the UE 100 or after a cell change (e.g. handover, RRC connection re-establishment, RRC connection release with redirection, primary cell change in multi-carrier or carrier aggregation, primary carrier change in multi-carrier or carrier aggregation etc).

In additional or alternative embodiments to those described above with reference to FIG. 21, the network node 120, 140 may determine information on the capability of the UE 100 without requiring the UE 100 to specifically transmit the information to the network node 120, 140. In other words, the network node 120, 140 determines information on the capability of the UE 100 implicitly from the behaviour of the UE 100 in certain network conditions or scenarios.

For example the network node 120, 140 may implicitly determine whether the UE 100 is capable of performing switching between link adaptation algorithms based on the radio performance experienced by the UE 100 and/or on the radio measurements (e.g. CSI reports, SNR, SINR, BLER etc) sent by the UE 100 when the UE 100 operates in a multiple-antenna mode.

An example of the radio performance is the hybrid automatic repeat request (HARQ) BLER for the downlink reception at the UE 100. In this case the network node 120, 140 can compare the radio performance experienced by the UE 100 and/or the radio measurements by the UE 100 with respective reference values that are obtained when the UE 100 does not perform any switching. If the difference to the reference value is more than a threshold, then the network node 120, 140 may assume that the UE 100 is capable of performing switching.

The network node 120, 140 may also implicitly determine whether the UE 100 is capable of switching by observing whether the measurement reports from the UE 100 are limited to a certain range under certain conditions over a certain time period. For example, if the network node 120, 140 observes that the CQI reports correspond to modulation and coding schemes which are limited to only, for example, QPSK and 16QAM modulations even though the signal quality (e.g. SNR) is above a threshold (e.g. 15 dB or more) over L TTIs (e.g. L=20 TTIs) then the network node 120, 140 may assume that the UE 100 is capable of performing autonomous switching between link adaptation algorithms when operating in a multiple-antenna mode. The network node 120, 140 may use the above principles to determine the capability of the UE 100 to switch for different UE-supported frequency bands and carrier aggregation configurations, etc.

Figure 22:
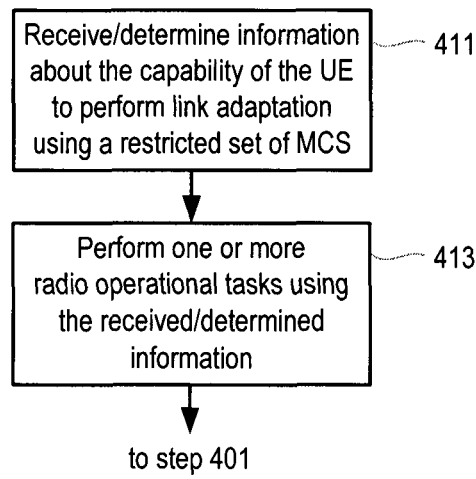
FIG. 22 is a flow chart illustrating a method of operating a node in the network following receipt of the information sent according to the method in FIG. 21.

As shown in FIG. 22, after receiving or implicitly determining information about the capability of the UE to perform link adaptation using a restricted set of MCSs (step 411), the network node 120, 140 can perform one or more radio operation tasks or actions using the information (step 413).

The radio operation tasks performed in step 413 can comprise any one or more of the following: selecting a procedure, selecting one or more parameters (e.g. as described above) for inclusion in a configuration message relating to the switching between algorithms by the UE 100, taking a decision on whether to transmit specific pilot(s) such as dedicated pilots for this UE 100, deciding the type of antenna configuration to use, deciding the type of antenna transmission scheme to use, determining whether to perform cell change, determining the transmit power level, etc.

A more specific example of a radio operation task that can be performed in step 413 is, assuming that the UE 100 is capable of using different link adaptation algorithms, to take a decision at the network node 120, 140 on whether to configure the UE 100 to use a specific link adaptation algorithm, or whether the UE 100 can be allowed to autonomously determine the link adaptation algorithm to use. For example, if the UE 100 is capable of performing autonomous switching then the network node 120, 140 may not configure the UE 100 to use a specific link adaptation algorithm. In another example, if the UE 100 is capable of switching between algorithms only for certain bands (e.g. band I) then the network node 120, 140 may perform a cell change for the UE 100 to ensure that the UE 100 operates on the band on which it can perform switching.

There is therefore provided a way of operating a mobile device (UE) that is receiving multi-antenna downlink transmissions that can perform link adaptation using only common pilots received from the base station (Node B) and that provides improved performance over conventional link adaptation methods used when demodulation pilots are not available.

The disclosed methods enable reduction in overheads of dedicated pilots and/or restricted transmission of dedicated pilots in certain scenarios while still ensuring that there is significant performance gain for UEs using MIMO.

Moreover, embodiments of the invention provide that the network can determine whether the mobile device is performing switching between algorithms or not, and in response can adapt one or more parameters of the network, such as deciding whether to send dedicated pilots.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method of operating a mobile device that is configured to receive a multi-antenna downlink transmission from a network node of a mobile communication network, the mobile device being configured to perform link adaptation to select a suitable Modulation and Coding Scheme (MCS) from a plurality of available MCSs for the multi-antenna downlink transmission, the method comprising:
   determining whether to use an unrestricted set of MCSs or a restricted set of MCSs, the unrestricted set of MCSs comprising all of the plurality of available MCSs, the restricted set comprising a subset of the plurality of available MCSs, wherein said step of determining comprises:
      determining whether the mobile communication network is sending dedicated pilots or reference signals to the mobile device for demodulation;
      in the event that dedicated pilots or reference signals are being transmitted, determining whether the dedicated pilots or reference signals are being transmitted with restrictions;
      in the event that the dedicated pilots or reference signals are not being transmitted with restrictions, determining that the unrestricted set of MCSs is to be used; and
      otherwise determining that the restricted set of MCSs is to be used; and
   using, according to said step of determining, either the restricted set of MCSs or the unrestricted set of MCs to select the MCS to be used for performing link adaptation for the multi-antenna downlink transmission.

2. The method as claimed in claim 1, wherein there is at least one MCS in the plurality of available MCSs that is in the unrestricted set of MCSs but not in the restricted set of MCSs.

3. The method as claimed in claim 1, further comprising performing said step of determining following receipt of a signal from a network node indicating that the mobile device is permitted to determine whether to use restricted or unrestricted sets of MCSs.

4. The method as claimed in claim 1, further comprising the step of transmitting capability information to a network node, wherein the capability information indicates whether the mobile device is capable of determining whether to use restricted or unrestricted sets of MCSs for selecting the MCS to be used for performing link adaptation of multi-antenna downlink transmissions to the mobile device.

5. The method as claimed in claim 1, wherein the step of performing the link adaptation to select the MCS for the multi-antenna downlink transmission using the unrestricted set of MCSs comprises using a first look-up table comprising entries for all of the plurality of available MCSs, and the step of performing the link adaptation to select the MCS for the multi-antenna downlink transmission using the restricted set of MCSs comprises using a second look-up table comprising entries for only the MCSs in the restricted set.

6. A mobile device for use in a mobile communication network, the mobile device comprising:
   a transceiver module configured to receive multi-antenna downlink transmissions from the network; and
   a processing circuit configured to:
   determine whether to use an unrestricted set of Modulation and Coding Schemes (MCSs) or a restricted set of MCSs, where the unrestricted set of MCSs comprises all of a plurality of available MCSs, and the restricted set of MCSs comprises a subset of the plurality of available MCSs, wherein the processing circuit is configured to determine whether to use the unrestricted set of MCSs or the restricted set of MCSs by:
      determining whether the mobile communication network is sending dedicated pilots or reference signals to the mobile device for demodulation;
      in the event that dedicated pilots or reference signals are being transmitted, determining whether the dedicated pilots or reference signals are being transmitted with restrictions;
      in the event that the dedicated pilots or reference signals are not being transmitted with restrictions, determining that the unrestricted set of MCSs is to be used; and
      otherwise determining that the restricted set of MCSs is to be used; and
   use, according to said determination, either the restricted set of MCSs or the unrestricted set of MCSs to select the MCS to be used for performing link adaptation for the multi-antenna downlink transmission.

7. A method of operating a network node in a mobile communication network, the mobile communication network comprising a mobile device configured to receive a multi-antenna downlink transmission from the network node, the mobile device being configured to select a suitable Modulation and Coding Scheme (MCS) from a plurality of available MCSs for performing link adaptation for the multi-antenna downlink transmission, the method of operating the network node comprising:
   determining whether the mobile device is permitted to or should use a restricted set of MCSs for selecting the MCS to be used for performing link adaptation for the multi-antenna downlink transmission, the restricted set of MCSs comprising a subset of the plurality of available MCSs; and
   in the event that it is determined that the mobile device is permitted to use or should use the restricted set of MCSs when performing the link adaptation, indicating to the mobile device that it is permitted to use or should use the restricted set of MCSs when performing the link adaptation by transmitting dedicated pilots or references signals to the mobile device with restrictions; and
   otherwise transmitting the dedicated pilots or references signals to the mobile device without the restrictions, and thereby indicating to the mobile device to use the unrestricted set of MCSs when performing the link adaptation.

8. The method as claimed in claim 7, the method further comprising obtaining capability information for the mobile device, the capability information indicating whether the mobile device is capable of determining whether to use restricted or unrestricted sets of MCS s.

9. The method as claimed in claim 7, wherein the method further comprises the step of receiving information on the set of MCSs used by the mobile device for MCS selection.

10. The method as claimed in claim 8, the method further comprising the step of performing one or more radio operation tasks based on the received or determined information.

11. A network node for use in a mobile communication network, the mobile network comprising a mobile device configured to receive a multi-antenna downlink transmission from the network, the mobile device being configured to select a suitable Modulation and Coding Scheme (MCS) from a plurality of available MCSs for performing link adaptation for the multi-antenna downlink transmission, the network node comprising:
- a communication module for communicating with the mobile device; and
- a processing module configured to:
  - determine whether the mobile device is permitted to or should use a restricted set of MCSs when performing link adaptation for the multi-antenna downlink transmission, the restricted set comprising a subset of the plurality of available MCSs;
  - indicate to the mobile device, using the communication module, that the mobile device is permitted to use or should use the restricted set of MCSs when performing the link adaptation by transmitting dedicated pilots or references signals to the mobile device with restrictions the mobile device, in the event that the network node determines that the mobile device is permitted to or should use a restricted set of MCSs when performing the link adaptation; and
  - otherwise transmit the dedicated pilots or references signals to the mobile device without the restrictions, and thereby indicate to the mobile device to use the unrestricted set of MCSs when performing the link adaptation.

12. A non-transitory computer readable medium storing a computer program comprising program instruction that, when executed by a processing circuit of a mobile device configuration for operation in a mobile communication network, configures the mobile device to:
- determine whether to use an unrestricted set of Modulation and Coding Schemes (MCSs) or a restricted set of MCSs, the unrestricted set of MCSs comprising all of a plurality of available MCSs and the restricted set comprising a subset of the plurality of available MCSs, wherein the determination is performed by:
  - determining whether the mobile communication network is sending dedicated pilots or reference signals to the mobile device for demodulation;
  - in the event that dedicated pilots or reference signals are being transmitted, determining whether the dedicated pilots or reference signals are being transmitted with restrictions;
  - in the event that the dedicated pilots or reference signals are not being transmitted with restrictions, determining that the unrestricted set of MCSs is to be used; and
  - otherwise determining that the restricted set of MCSs is to be used; and
- use, according to said determination, either the restricted set of MCSs or the unrestricted set of MCs to select the MCS to be used for performing link adaptation for a multi-antenna downlink transmission from the mobile communication network to the mobile device.

* * * * *